(12) United States Patent
Kawabe et al.

(10) Patent No.: US 8,130,307 B2
(45) Date of Patent: Mar. 6, 2012

(54) DRIVE CIRCUIT AND DRIVING METHOD FOR CHARGE TRANSFER UNIT AND CHARGE TRANSFER SYSTEM

(75) Inventors: Azuma Kawabe, Fukuoka (JP); Hidenobu Kakioka, Fukuoka (JP); Fumiaki Fukuoka, Fukuoka (JP); Isao Hirota, Kanagawa (JP); Masahiro Segami, Kanagawa (JP); Yukihisa Kinugasa, Tokyo (JP)

(73) Assignee: Sony Corporation, Tokyo (JP)

( * ) Notice: Subject to any disclaimer, the term of this patent is extended or adjusted under 35 U.S.C. 154(b) by 1375 days.

(21) Appl. No.: 11/700,639

(22) Filed: Jan. 31, 2007

(65) Prior Publication Data
US 2007/0188637 A1 Aug. 16, 2007

(30) Foreign Application Priority Data
Feb. 16, 2006 (JP) .................. 2006-038795

(51) Int. Cl.
*H04N 5/335* (2006.01)
*H03K 4/06* (2006.01)
(52) U.S. Cl. ....................... 348/312; 327/132
(58) Field of Classification Search .......... 348/294, 348/311, 312, 316; 327/100, 101, 131, 132
See application file for complete search history.

(56) References Cited

U.S. PATENT DOCUMENTS

| | | | |
|---|---|---|---|
| 7,518,648 B2 * | 4/2009 | Tagami et al. | 348/312 |
| 7,750,964 B2 * | 7/2010 | Hirota et al. | 348/312 |
| 7,773,271 B2 * | 8/2010 | Yamada et al. | 348/241 |
| 2002/0048109 A1 * | 4/2002 | Chaiken et al. | 360/67 |
| 2005/0088224 A1 * | 4/2005 | Ookawa | 327/552 |

FOREIGN PATENT DOCUMENTS

| | | |
|---|---|---|
| JP | 05-259844 | 10/1993 |
| JP | 06-124133 | 5/1994 |
| JP | 10-270991 | 10/1998 |
| JP | 2000-138943 | 5/2000 |
| JP | 2001-103380 | 4/2001 |
| JP | 2004-282725 | 10/2004 |
| JP | 2005-130185 | 5/2005 |
| JP | 2005-269060 | 9/2005 |
| WO | 02/35740 | 5/2002 |

* cited by examiner

*Primary Examiner* — Nhan T Tran
(74) *Attorney, Agent, or Firm* — Robert J. Depke; Rockey, Depke & Lyons, LLC

(57) ABSTRACT

A drive circuit applying two or more drive voltages to a charge transfer unit includes at least one current mirror circuit that receives a reference current and outputs a predetermined current; at least one switch circuit that switches the current output from the at least one current mirror circuit to apply the multiple drive voltages to the charge transfer unit; and at least one time constant circuit that gives a predetermined time constant to the reference current in the switching by the switch circuit.

9 Claims, 14 Drawing Sheets

DRIVE CIRCUIT AND DRIVING METHOD FOR CHARGE TRANSFER UNIT AND CHARGE TRANSFER SYSTEM

CROSS REFERENCES TO RELATED APPLICATIONS

The present invention contains subject matter related to Japanese Patent Application JP 2006-038795 filed in the Japanese Patent Office on Feb. 16, 2006, the entire contents of which are incorporated herein by reference.

BACKGROUND OF THE INVENTION

1. Field of the Invention

The present invention relates to circuits, apparatuses, and systems, which drive capacitive loads such as charge coupled devices (CCDs). More particularly, the present invention relates to a drive circuit and a driving method for a charge transfer device and a charge transfer system, which are capable of reducing interference between two or more drive voltages that are applied.

2. Description of the Related Art

In recent years, there is a growing request that images be picked up at higher speed, regardless of television (TV) systems, to slow down the playback speed in video cameras having CCDs mounted therein. In addition, the digital cameras having CCDs mounted therein has a problem in that the transfer speeds are reduced with the increasing number of pixels. As a result, it is desired to provide high-speed imagers.

FIG. 12A shows an example of the structure of a CCD imaging apparatus in related art and FIG. 12B illustrates how to drive the CCD imaging apparatus. FIG. 12A shows an example of the structure of the main part of an imaging apparatus 30 using an interline transfer (IT) CCD. The imaging apparatus 30 in FIG. 12A includes multiple photosensors 31, which are pixels, arranged in an array form. The imaging apparatus 30 also includes multiple CCD vertical transfer registers 33 for every column of the photosensors 31 and a CCD horizontal transfer register 34 that is connected to the bottoms of the vertical transfer registers 33. An output unit 36 is connected downstream of the horizontal transfer register 34.

Two vertical transfer electrodes are provided for every photosensor 31 in the vertical transfer registers 33. Signal charge is vertically transferred and driven by using four-phase vertical drive pulses φV1, φV2, φV3, and φV4. Specifically, the vertical drive pulses φV1, φV2, φV3, and φV4 are applied to four vertical transfer electrodes 32 (321, 322, 323, and 324), respectively. The vertical transfer electrodes 321 and 323 are arranged at positions corresponding to the photosensors 31. The bottom photosensors 31 correspond to the vertical transfer electrode 321 to which the vertical drive pulse φV1 is applied.

The vertical transfer registers 33 are connected to the horizontal transfer register 34 via the vertical transfer electrodes 321 to 324 corresponding to one bit in the bottom, to which the vertical drive pulses φV1 to φV4 are applied. The vertical transfer electrodes 321 to 324 horizontally extend so as to be shared between the vertical transfer registers 33.

Two horizontal transfer electrodes 35 (351 and 352) are provided for every vertical transfer register 33 in the horizontal transfer register 34. Signal charge is horizontally transferred and driven by using two-phase horizontal transfer pulses φH1 and φH2.

In the imaging apparatus 30, the photosensor 31 detects light, performs photoelectric conversion to the detected light, and accumulates the signal charge corresponding to the amount of the detected light. The signal charge in the photosensor 31 is read out from the photosensor 31 to the vertical transfer register 33 during a vertical blanking interval and, then, the signal charge for every horizontal line is vertically transferred during a horizontal blanking interval (hereinafter referred to as "vertical line shift") to transfer the signal charge to the horizontal transfer register 34. The signal charge transferred to the horizontal transfer register 34 is horizontally transferred during a horizontal scanning period and is output through the output unit 36.

In the vertical line shift in the CCD in the related art, the signal charge is transferred and driven by using the vertical drive pulses φV1 to φV4 during a horizontal blanking interval Hb in the TV system. FIG. 12B shows driving timings in the vertical line shift. As shown in FIG. 12B, in the vertical line shift, the signal charge held in, for example, the vertical transfer electrodes 322 and 323 corresponding to the vertical drive pulses φV2 and φV3 is vertically shifted to the horizontal transfer register 34 by using the four-phase vertical drive pulses φV1 to φV4 during the horizontal blanking interval Hb.

Specifically, the signal charge is transferred to the horizontal transfer electrode 351, to which the horizontal drive pulse φH1 is applied, in the horizontal transfer register 34 at a falling edge of the vertical drive pulse φV4 to be applied to the vertical transfer electrode 324. In the vertical line shift, the slope ΔV/ΔT (ΔV denotes a voltage and ΔT denotes time) of rising and falling edges of the vertical drive pulses φV1 to φV4 to be applied to the vertical transfer electrodes 321 to 324 during the horizontal blanking interval Hb, that is, a transient speed (ΔV/ΔT) is made equal to the transient speed (ΔV/ΔT) of the vertical drive pulses φV1 to φV4 to be applied to the vertical transfer electrodes 321 to 324 during the vertical blanking interval, although not shown. FIG. 12B shows rectangular drive pulses having the rising and falling edges perpendicular to the time axis.

It is necessary to perform high-speed vertical transfer during the vertical blanking interval, for example, in correction of camera shaking in CCD video cameras or in a frame interline transfer (FIT) CCDs for broadcasting services.

Vertical line shift that is performed by using four-phase vertical drive pulses during the horizontal blanking interval in CCD imagers is disclosed in, for example, Japanese Unexamined Patent Application Publication No. 2000-138943.

SUMMARY OF THE INVENTION

In the CCDs in the related art, described above, the vertical line shift and the high-speed vertical transfer are driven by vertical scanning drive circuits, that is, vertical drivers, having the same characteristics. Generally, high-speed complementary metal oxide semiconductor (CMOS) vertical drivers are used in the vertical line shift and the high-speed vertical transfer. Accordingly, performing the vertical transfer during the horizontal scanning period can produce noise due to crosstalk in the CCDs at the moment when the vertical drive pulses φV1 to φV4 are applied.

In other words, since the transient speed at the rising and falling edges of the drive waveform is high, that is, the slope ΔV/ΔT of the rising and falling edges of the vertical drive pulses φV1 to φV4 is steep in the vertical transfer during the horizontal scanning period, the crosstalk noise is produced in the output signals from the CCDs, thus producing vertical stripe noise in the image.

Degradation in image quality (occurrence of noise) due to the drive waveform having a higher transient speed will now be described in detail with reference to FIG. 13. FIG. 13 shows an equivalent circuit of a CCD and a vertical driver in related art.

Referring to FIG. 13, a vertical driver 40 supplies either of constant voltages V1 and V2 applied to terminals 401 and 402 to a CCD 60 through an output terminal 404 as an output voltage Vout. For example, the voltage V1 is set to a higher level and the voltage V2 is set to a lower level.

In the vertical driver 40, a control signal Din is input through an input terminal 403 and a control signal Vg1 or Vg2 for turning on a switch 44 or 45 is output from a level shifter circuit (L/S) 42 or 43 in accordance with the level of the control signal Din. The output voltage Vout under normal operating conditions is equal to the voltage V1 when the switch 44 is turned on while the output voltage Vout under normal operating conditions is equal to the voltage V2 when the switch 45 is turned on.

The CCD 60 is driven via an electrode 601 by using the output voltage Vout supplied from the vertical driver 40 and is also driven by another vertical or horizontal driver (hereinafter referred to as a driver 70) via an electrode 602. In the CCD 60 in FIG. 13, reference letter and numeral R61 denotes an equivalent resistor of a CCD substrate, reference letters and numerals C62 and C63 denote equivalent capacitors between the electrodes and the CCD substrate, and reference letter and numeral C64 denotes an equivalent capacitor between the electrodes. The CCD 60 is a capacitive load, viewed from the vertical driver 40.

In the equivalent circuit shown in FIG. 13, a step response of the output voltage Vout is calculated, for example, when the output voltage Vout is increased from zero to the voltage V1 (voltage V). FIG. 14A shows an equivalent circuit for yielding the step response of the output voltage Vout. FIG. 14B shows examples of response waveforms output from the equivalent circuit in FIG. 14A. Referring to FIG. 14A, reference letter and numeral R44 denotes an equivalent resistor (equivalent impedance) of the switch 44.

In the equivalent circuit shown in FIG. 14A, the step response of the output voltage Vout is calculated according to Equation (1). At a time t=0, the step response of the output voltage Vout is calculated according to Equation (2).

$$\text{Output voltage } Vout(t)=V\cdot[1-(R44/(R44+R61))\cdot\exp(-t/(C62(R44+R61)))] \quad (1)$$

$$\text{Output voltage } Vout(0)=V\cdot(R61/(R61+R44)) \quad (2)$$

FIG. 14B shows response waveforms of the output voltage Vout when R61=R44 and when R61=0. As shown in FIG. 14B, if the equivalent resistor R61 of the CCD substrate is not equal to zero (normally, is not equal to zero), the output voltage Vout rises steeply at the time t=0.

In the CCD 60, a drive voltage having a response waveform different from that of the output voltage Vout is applied to the electrode 602 simultaneously with the application of the voltage shown in Equation (1) to the electrode 601. The equivalent capacitor C64, which is the coupling capacitance between the electrodes 601 and 602, and the output impedance of the driver 70 form a differentiation circuit and the output voltage Vout has an effect on the electrode 602 (interferes with the electrode 602). This effect becomes noticeable when the output voltage Vout rises steeply at the time t=0.

In addition, if the resistance of the equivalent resistor R61 of the CCD substrate is not equal to zero (normally, is not equal to zero), a voltage $V_{603}(t)$ measured at a terminal 603 is calculated according to Equation (3). The voltage $V_{603}(t)$ also has an effect on the electrode 602 (interferes with the electrode 602) via the capacitor C63 at the time t=0. A time constant τ603 is calculated according to Equation (4).

$$V_{603}(t)=V\cdot(R61/(R44+R61))\cdot\exp(-t/(C62(R44+R61))) \quad (3)$$

$$\tau_{603}=C62(R44+R61) \quad (4)$$

Equation (3) shows that the step response of the voltage $V_{603}(t)$ rises steeply by an amount corresponding to V·(R61 (R44+R61)) at the time t=0 and has a waveform converging at the time constant being equal to (C62(R44+R61)).

As described above, the interference of a transient variation in the drive voltage applied to one electrode with the drive voltage applied to another electrode can cause degradation in the image quality, such as crosstalk noise. Accordingly, in the related art, the vertical drive (vertical transfer) is performed in the horizontal blanking interval (not in the horizontal scanning period) in order to prevent the degradation in the image quality, thus prohibiting an increase in the transfer speed in the CCD.

Since the equivalent capacitance between the electrodes in the CCD largely depends on the number of pixels, the used process, and/or the layout, the transient characteristics of the drive voltage output from the vertical driver in the related art, optimized for a certain CCD, are not necessarily optimal for other CCDs. Consequently, it is desirable to provide a method of easily controlling the transient characteristics of the drive voltage depending on the CCDs.

It is desirable to provide a drive circuit and a driving method having reduced interference between two or more drive voltages applied to a capacitive load, such as a CCD. It is also desirable to provide a charge transfer system in which such a drive circuit is applied to a solid-state imaging device, such as a CCD.

According to an embodiment of the present invention, a drive circuit applying two or more drive voltages to a charge transfer unit includes at least one current mirror circuit that receives a reference current and outputs a predetermined current; at least one switch circuit that switches the current output from the at least one current mirror circuit to apply the multiple drive voltages to the charge transfer unit; and at least one time constant circuit that gives a predetermined time constant to the reference current in the switching by the switch circuit.

The drive circuit adopts a driving method in which the reference current is received from a reference power supply and a current is output through the current mirror circuit to apply two or more drive voltages to a load, such as a CCD. Slow switching of the current with a predetermined time constant can decrease the transient speed of the drive voltages to reduce the interference between the drive voltages.

For example, Equation (3) expresses the response at the terminal 603 in FIG. 13 when the charge transfer unit is driven using the voltage Vout having a step voltage waveform. Driving the charge transfer unit not by the step driving but with a time constant sufficiently larger than the time constant (C62 (R44+R61)) eliminates any response having a steep slope, thus reducing the interference.

In the application of the drive circuit to the charge transfer unit, the provision of the buffer unit that temporarily stores the charge between the vertical charge transfer unit and the horizontal charge transfer unit can realize the vertical charge transfer in which the interference between the drive voltages is inhibited in the vertical charge transfer unit even during the charge transfer period in the horizontal charge transfer unit. According to the present invention, it is possible to reduce the interference between the two or more drive voltages applied to the capacitive load, such as a CCD. In addition, according to the present invention, it is possible to prevent degradation in the image quality even when the vertical drive (vertical transfer) is performed in the horizontal scanning period to increase the processing speed in the system.

DESCRIPTION OF THE PREFERRED EMBODIMENTS

Figure 1:
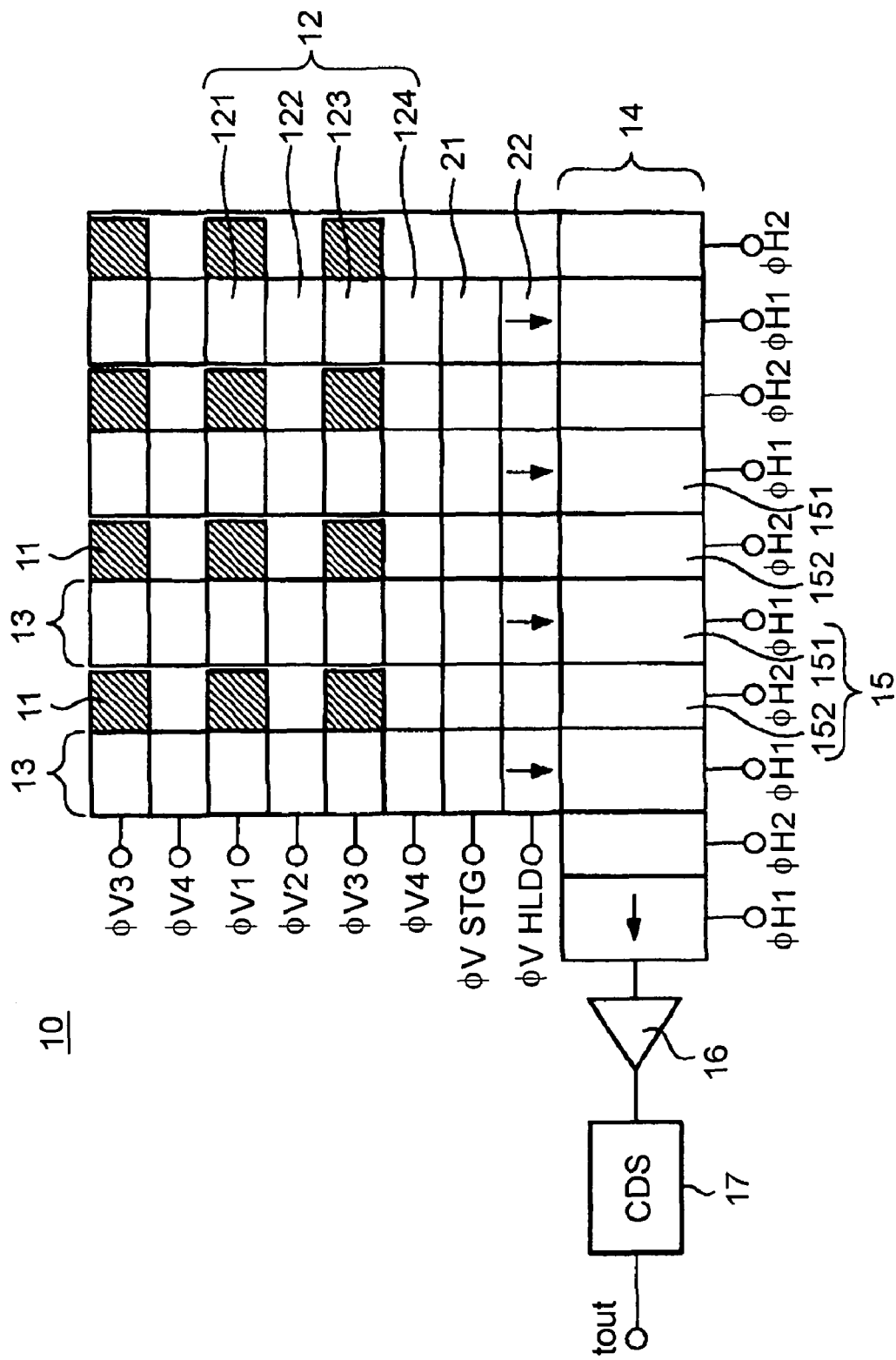
FIG. 1 shows an example of the structure of an imaging apparatus according to an embodiment of the present invention.

Embodiments of the present invention will now be described with reference to the accompanying drawings.
Structure of Imaging Apparatus FIG. 1 shows an example of the structure of an imaging apparatus according to an embodiment of the present invention. The main part of the imaging apparatus using an IT CCD is shown in FIG. 1.

Referring to FIG. 1, an imaging apparatus 10 according to the embodiment of the present invention includes multiple photosensors 11, which are pixels, arranged in an array form. The imaging apparatus 10 also includes multiple CCD vertical transfer registers 13 for every column of the photosensors 11 and a CCD horizontal transfer register 14 that is connected to the bottoms of the vertical transfer registers 13. An output unit 16 and a correlated double sampling (CDS) circuit 17 are connected downstream of the horizontal transfer register 14. The CDS circuit 17 is connected to an output terminal tout.

Two vertical transfer electrodes are provided for every photosensor 11 in the vertical transfer registers 13. Signal charge is vertically transferred and driven by using four-phase vertical drive pulses $\phi V1$, $\phi V2$, $\phi V3$, and $\phi V4$. Specifically, the vertical drive pulses $\phi V1$, $\phi V2$, $\phi V3$, and $\phi V4$ are applied to four vertical transfer electrodes 12 (121, 122, 123, and 124), respectively. The vertical transfer electrodes 121 and 123 are arranged at positions corresponding to the photosensors 31. The bottom photosensors 11 correspond to the vertical transfer electrode 123 to which the vertical drive pulse $\phi V3$ is applied.

The vertical transfer registers 13 are connected to the horizontal transfer register 14 via a storage gate unit STG and a hold gate unit HLG. The storage gate unit STG is a buffer unit provided downstream of the bottom vertical transfer electrode 124 (the vertical transfer electrode to which the vertical drive pulse $\phi V4$ is applied). The vertical transfer electrodes 121 to 124, a transfer electrode 21 in the storage gate unit STG, and a transfer electrode 22 in the hold gate unit HLG horizontally extend so as to be shared between the vertical transfer registers 13.

Two horizontal transfer electrodes 15 (151 and 152) are provided for every vertical transfer register 13 in the horizontal transfer register 14. Signal charge is horizontally transferred and driven by using two-phase horizontal transfer pulses $\phi H1$ and $\phi H2$.

According to the embodiment of the present invention, the vertical transfer of the signal charge in the vertical transfer register 13, that is, the vertical line shift is performed during a horizontal scanning period Hs to shorten the horizontal blanking interval Hb. Accordingly, as described above, the storage gate unit STG and the hold gate unit HLG are provided between the transfer section including the bottom vertical transfer electrode 124 across the vertical transfer registers 13 and the horizontal transfer register 14.

In the vertical line shift, the four-phase vertical drive pulses $\phi V1$ to $\phi V4$ are applied to the vertical transfer electrodes 121 to 124, and a storage gate voltage $\phi VSTG$ and a hold gate voltage $\phi VHLG$ are applied to the storage gate unit STG and the hold gate unit HLG, respectively.

Figure 2:
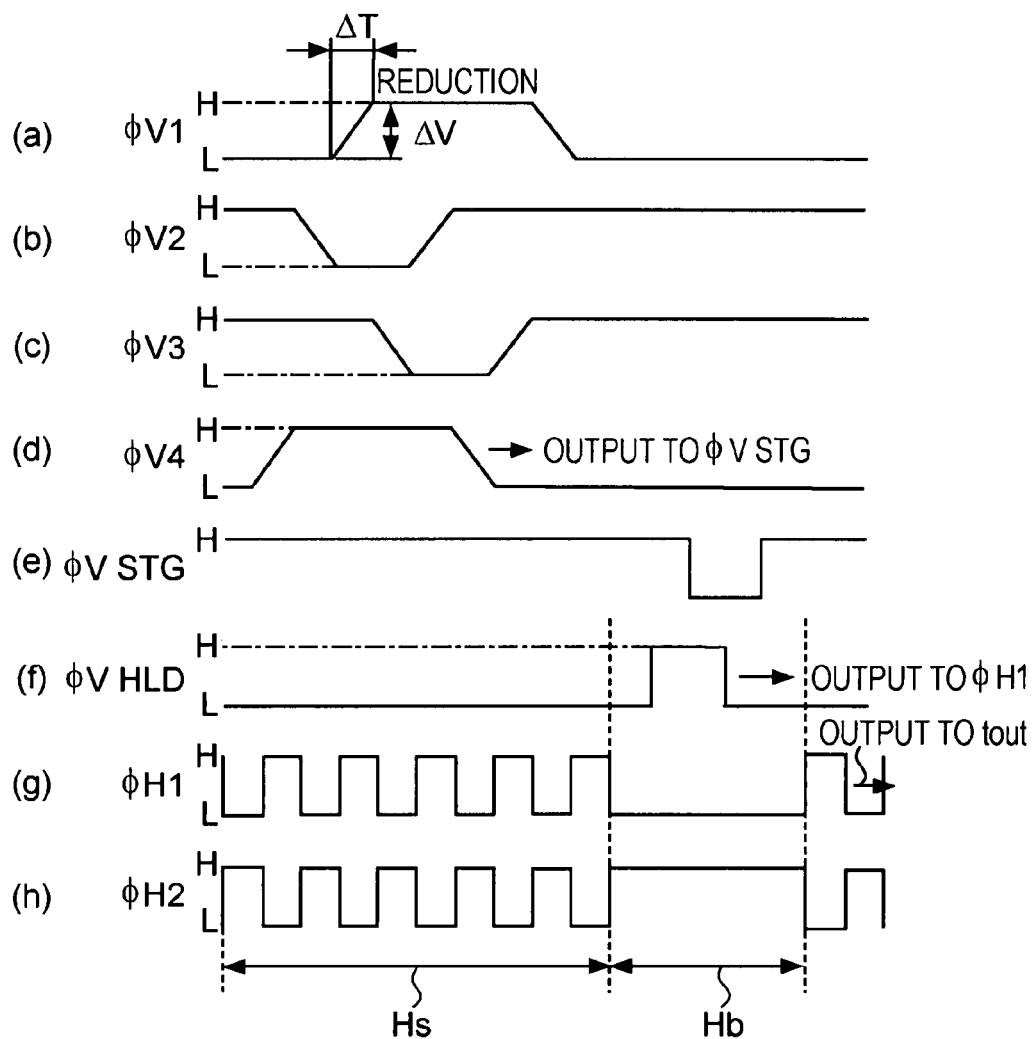
FIG. 2 is a timing chart showing examples of the waveforms of drive voltages in the imaging apparatus according to the embodiment of the present invention.

FIG. 2 is a timing chart showing examples of the waveforms of drive voltages in the imaging apparatus 10. According to the embodiment of the present invention, in order to perform the vertical line shift during the horizontal scanning period Hs, any effect of crosstalk noise caused by rising and falling edges of the clock waveforms of the vertical drive pulses $\phi V1$ to $\phi V4$ in the transfer section in the imaging apparatus 10 is to be eliminated. The rising and falling edges of the clock waveforms of the vertical drive pulses $\phi V1$ to $\phi V4$ are called transient. In this embodiment of the present invention, this elimination of the effect is achieved by reducing the slope $\Delta V/\Delta T$ ($\Delta V$ denotes a pulse voltage and $\Delta T$ denotes time) of the rising and falling edges of the vertical drive pulses $\phi V1$ to $\phi V4$ in the vertical line shift, that is, by decreasing the transient speed, as shown by (a) in FIG. 2.

The transient speed $\Delta V/\Delta T$ is decreased to a level at which the crosstalk noise produced when the vertical drive pulses $\phi V1$ to $\phi V4$ are applied can be removed by the CDS circuit 17. A method of decreasing the transient speed $\Delta V/\Delta T$ of the vertical drive pulses $\phi V1$ to $\phi V4$ will be described below in detail.

In the imaging apparatus according to the embodiment of the present invention, decreasing the transient speed ΔV/ΔT of the vertical drive pulses allows the vertical drive ((a) to (d) in FIG. 2) and the horizontal drive ((g) to (h) in FIG. 2) to be simultaneously performed to increase the charge transfer speed in the CCD.

An experiment using a slower transient speed ΔV/ΔT of the vertical drive pulses φV1 to φV4 showed that the crosstalk noise produced in the vertical line shift was removed by the CDS circuit 17 if the transient speed ΔV/ΔT is lower than or equal to 50 mV/nsec (not including zero) and, therefore, the effect of the image noise (vertical stripe) on the output from the solid-state imaging device such as a CCD was eliminated even when the vertical line shift is performed during the horizontal scanning period Hs. In other words, since the crosstalk noise produced by the vertical drive pulses when the transient speed ΔV/ΔT is lower than or equal to 50 mV/nsec (not including zero) has no higher frequency component, the crosstalk noise can be sufficiently removed by the CDS circuit 17.

For comparison, the transient speed ΔV/ΔT of the vertical drive pulses in the vertical line shift in the related art is about 1 V/nsec. Since the crosstalk noise produced by such vertical drive pulses has higher frequency components, it is not possible to remove the crosstalk noise by a CDS circuit.

A method of driving the imaging apparatus 10 will now be described. In the imaging apparatus 10, the photosensor 11 detects light, performs photoelectric conversion to the detected light, and accumulates the signal charge corresponding to the amount of the detected light. The signal charge in the photosensor 11 is read out from the photosensor 11 to the vertical transfer register 13 during the vertical blanking interval and, then, the signal charge for every horizontal line is vertically transferred in the vertical line shift. The signal charge corresponding to the photosensor 11 at the bottom is transferred to the storage gate unit STG between the vertical transfer registers 13 and the horizontal transfer register 14.

The signal charge transferred to the storage gate unit STG is transferred to the horizontal transfer register 14 via the hold gate unit HLG during the horizontal blanking interval Hb. The signal charge transferred to the horizontal transfer register 14 is horizontally transferred during the horizontal scanning period Hs and is output from the output terminal tout through the output unit 16 and the CDS circuit 17.

The vertical line shift described above is performed during the horizontal scanning period Hs during which the signal charge in the horizontal transfer register 14 is horizontally transferred to transfer the signal charge to the storage gate unit STG. Since it is sufficient to transfer the signal charge from the storage gate unit STG to the horizontal transfer register 14 owing to the storage gate voltage φVSTG and the hold gate voltage φVHLG, the horizontal blanking interval Hb is reduced, compared with the related art.

Since the transient speed ΔV/ΔT of the vertical drive pulses φV1 to φV4 applied in the vertical line shift is low, the crosstalk noise produced in the vertical line shift has a lower frequency component and, therefore, can be removed by the CDS circuit 17, as described above.

Equivalent Circuit of Two-Voltage Output Vertical Driver and Vertical Electrode

A method of realizing a two-voltage output vertical driver having a slower transient speed ΔV/ΔT will now be described by using an equivalent circuit.

Figure 3:
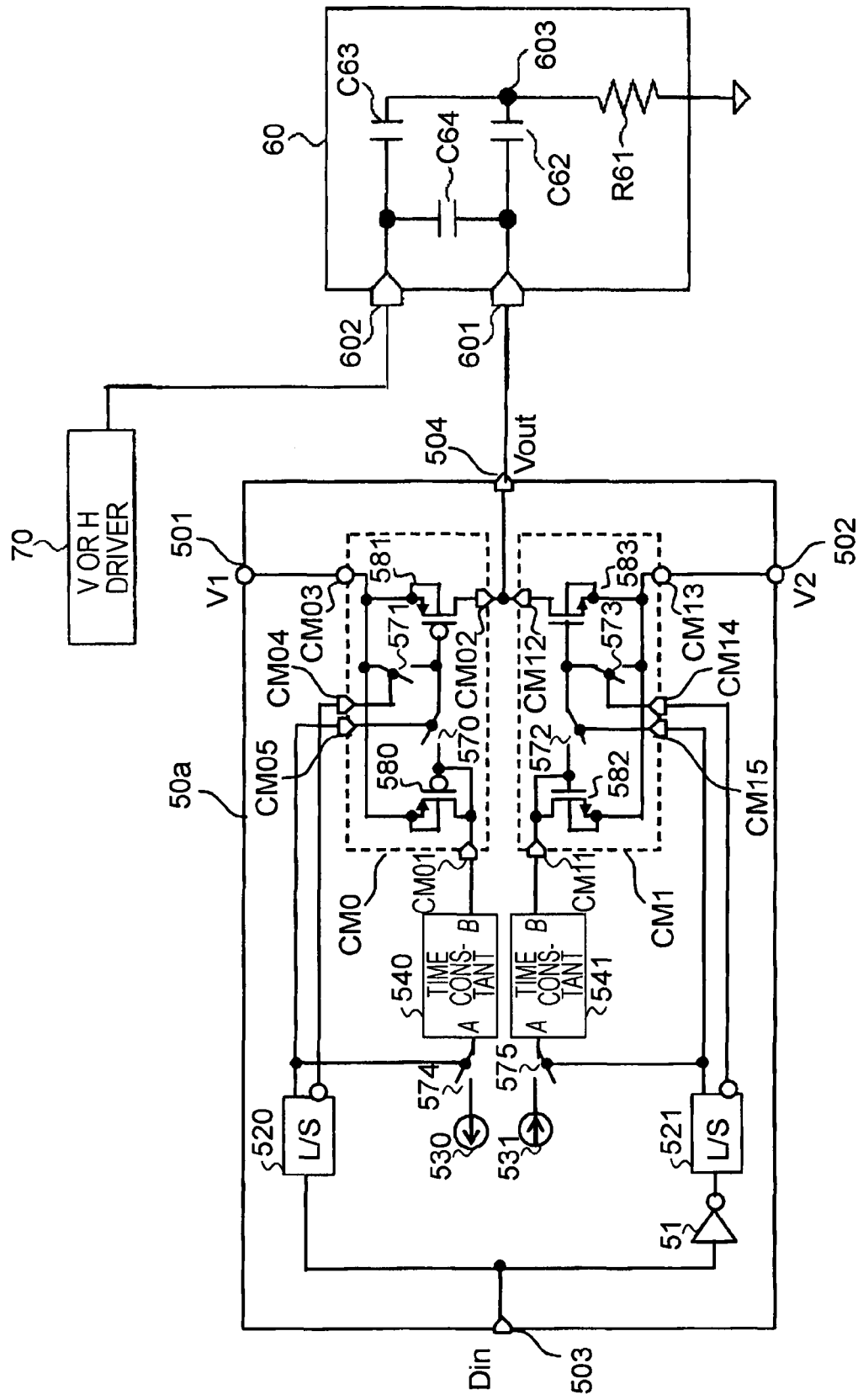
FIG. 3 shows an example of an equivalent circuit including a two-voltage output vertical driver, which is a drive circuit according to an embodiment of the present invention, and a CCD driven by the vertical driver.

FIG. 3 shows an example of an equivalent circuit including a vertical driver 50a, which is a drive circuit according to an embodiment of the present invention, and a CCD 60 driven by the vertical driver 50a. The vertical driver 50a generates, for example, the vertical drive pulses φV1 to φV4 shown in FIG. 1. The CCD 60 includes the vertical transfer electrodes 121 to 124 to which the vertical drive pulses φV1 to φV4 are applied, respectively. Although the vertical driver 50a generates only one vertical drive pulse (output voltage Vout) in the equivalent circuit in FIG. 3 for simplicity, the CCD 60 is actually driven by multiple drivers (including the driver 70).

Structure of Two-Voltage Output Vertical Driver

The vertical driver 50a according to the embodiment of the present invention includes reference power supplies 530 and 531, current mirror circuits CM0 and CM1, switches 570 to 573, time constant circuits 540 and 541, level shifters 520 and 521, and a logical circuit 51. The current mirror circuit CM0 includes transistors 580 and 581, and the current mirror circuit CM1 includes transistors 582 and 583. The switches 570 to 573 are used to switch a current slowly. The level shifters 520 and 521 are used to generate on-off voltages for the switches.

Switch Control in Two-Voltage Output Vertical Driver

An input signal Din is input in the vertical driver 50a according to the embodiment of the present invention, shown in FIG. 3, through an input terminal 503. The input terminal 503 is connected to the input terminals of the logical circuit 51 and the level shifter 520. The output terminal of the logical circuit 51 is connected to the input terminal of the level shifter 521.

The logical circuit 51 is an inverter and outputs the inverted signal of the input signal. The level shifters 520 and 521 each convert the input signal into a level in which the switches can be turned on and off and output a non-inverted signal and an inverted signal. The non-inverted signal from the level shifter 520 is supplied to the gates of the switches 570 and 574 and the inverted signal from the level shifter 520 is supplied to the gate of the switch 571. The non-inverted signal from the level shifter 521 is supplied to the gates of the switches 572 and 575 and the inverted signal from the level shifter 521 is supplied to the gate of the switch 573.

When the input signal Din is in a high (hereinafter referred to as "H") level, the switches 570, 574, and 573 are turned on and the switches 571, 575, and 572 are turned off because of the circuit configuration described above. When the input signal Din is in a low (hereinafter referred to as "L") level, the switches 570, 574, and 573 are turned off and the switches 571, 575, and 572 are turned on because of the circuit configuration described above.

In the vertical driver 50a according to the embodiment of the present invention, shown in FIG. 3, the reference power supply 530 is connected to one terminal of the switch 574, and the reference power supply 531 is connected to one terminal of the switch 575. The other terminal of the switch 574 is connected to the input side of the time constant circuit 540, and the other terminal of the switch 575 is connected to the input side of the time constant circuit 541. The output sides of the time constant circuits 540 and 541 are connected to the input sides of the current mirror circuits CM0 and CM1, respectively. The outputs from the current mirror circuits CM0 and CM1 are supplied to the CCD 60 through an output terminal 504 of the vertical driver 50a as a signal Vout.

Time Constant Circuit

Figure 4:
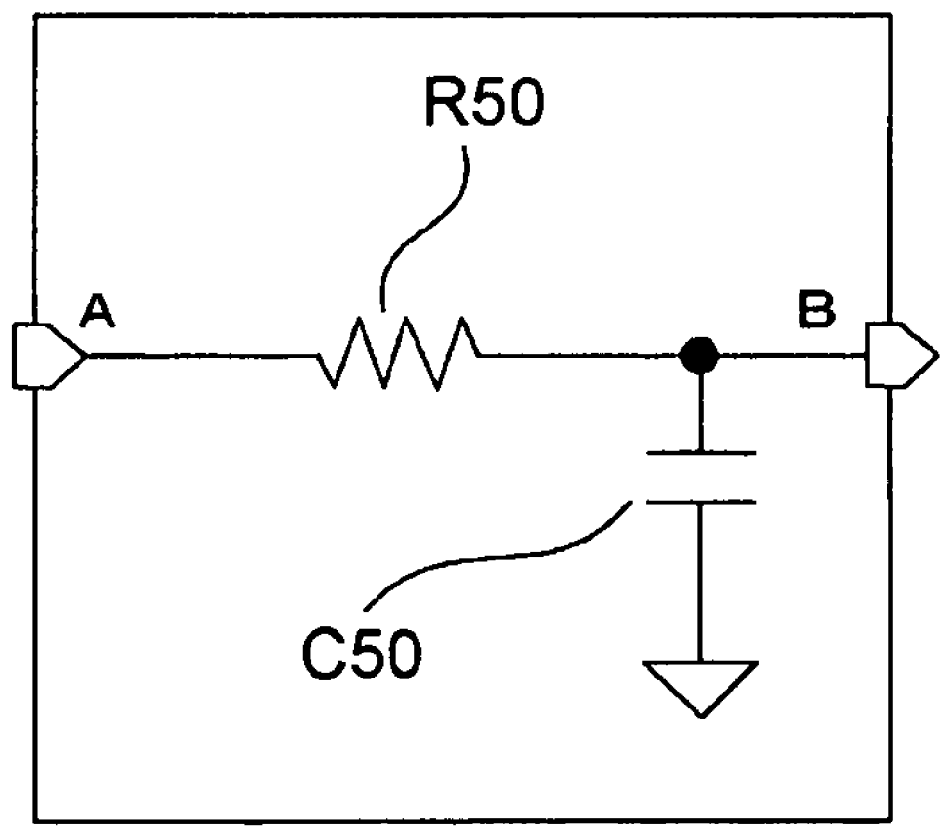
FIG. 4 shows an example of a time constant circuit.

The time constant circuits 540 and 541 are resistor-capacitor (RC) circuits, as shown in FIG. 4. In each of the time constant circuits 540 and 541, a resistor R50 is connected between the input terminal and the output terminal and a capacitor C50 is connected between the output terminal and the ground. A step response Vs(t) from each of the time constant circuit 540 and 541 is calculated according to Equation (5) where "Vi" denotes an input voltage. A time constant τ is represented by Equation (6).

The purpose of the present invention is to select the relationship between the time constant $\tau_{603}$ shown in Equation (4) and the time constant τ shown in Equation (6) so as to satisfy Expression (7) in order to reduce the interference between the drive voltages.

$$Vs(t) = Vi \cdot [1 - \exp(-t/(R50 \cdot C50))] \quad (5)$$

$$\tau = R50 \cdot C50 \quad (6)$$

$$\tau 603 < \tau \quad (7)$$

The resistor R50 and the capacitor C50 may be a parasitic resistor and a parasitic capacitor, respectively.

Current Mirror Circuit with Switches

In the vertical driver 50a according to the embodiment of the present invention, shown in FIG. 3, the pair of the P-type transistors 580 and 581 forms the current mirror circuit CM0 and the pair of the N-type transistors 582 and 583 forms the current mirror circuit CM1. The sources and bulks of the P-type transistors 580 and 581 are connected to a terminal 501 to receive a voltage V1. The sources and bulks of the N-type transistors 582 and 583 are connected to a terminal 502 to receive a voltage V2.

The input terminal CM01 of the current mirror circuit CM0 is connected to the drain and gate of the transistor 580 and one terminal of the switch 570, and the input terminal CM11 of the current mirror circuit CM1 is connected to the drain and gate of the transistor 582 and one terminal of the switch 572. The other terminal of the switch 570 is connected to the gate of the transistor 581 and one terminal of the switch 571, and the other terminal of the switch 572 is connected to the gate of the transistor 583 and one terminal of the switch 573. The other terminal of the switch 571 is connected to the terminal 501 of the vertical driver 50a to receive the voltage V1, and the other terminal of the switch 573 is connected to the terminal 502 of the vertical driver 50a to receive the voltage V2.

The outputs from the drains of the transistors 581 and 583, which are also the outputs, from the current mirror circuits CM0 and CM1, are output through the output terminal 504 of the vertical driver 50a as the signal Vout.

Operation of Two-Voltage Output Vertical Driver When Voltage V1 is Output

In the connection configuration described above, when the signal Din supplied through the input terminal 503 of the vertical driver 50a is switched from the "L" level to the "H" level, the switches 574, 570, and 573 are turned on and the switches 571, 575, and 572 are turned off, and the current from the reference power supply 530 slowly flows into the current mirror circuit CM0 through the time constant circuit 540. In a saturation region where the voltage Vout is lower than the overdrive voltage of the transistors 580 and 581 lower than the voltage V1, a current mirrored from the voltage V1 in accordance with the size ratio between the P-type transistors 580 and 581 is slowly output through the output terminal 504 of the vertical driver 50a as the signal Vout.

The overdrive voltage is given by subtracting the threshold of a transistor from the gate voltage of the transistor.

The signal Vout is supplied to an input terminal 601 of the CCD 60. Since the capacitive load of the capacitor C62 is normally dominant over the impedance of the input terminal 601 of the CCD 60, a current Iout supplied from the vertical driver 50a produces the voltage Vout having a slope given by dividing the current Iout by the capacitive load of the capacitor C62 on the time base according to Equation (8).

$$Vout(t) = (Iout/C62) \cdot t \quad (8)$$

The slope of the current Iout is reduced by passing through the time constant circuit 540 having the time constant τ according to Expression (7). The decrease in the transient speed of the voltage Vout allows the interference between the drive voltages to be reduced when two or more drive voltages are applied to the load, such as the CCD.

In a triode region where the voltage Vout is higher than the overdrive voltage of the transistors 580 and 581, since the conductance of the transistors decreases linearly and, therefore, the output current decreases, the final voltage Vout converges on the voltage V1. At this time, no current is output from the current mirror circuit CM1.

When Voltage V2 is Output

When the signal Din supplied through the input terminal 503 of the vertical driver 50a is switched from the "H" level to the "L" level, the switches 571, 575, and 572 are turned on and the switches 574, 570, and 573 are turned off, and the current from the reference power supply 531 slowly flows into the current mirror circuit CM1 through the time constant circuit 541. In a saturation region where the voltage Vout is higher than the overdrive voltage of the transistors 582 and 583 higher than the voltage V2, a current mirrored from the voltage V2 in accordance with the size ratio between the N-type transistors 582 and 583 is slowly output from the output terminal 504 of the vertical driver 50a as the signal Vout.

Since the transient speed of the output voltage Vout, which is higher than the voltage V2, is decreased, it is possible to reduce the interference between the drive voltages when two or more drive voltages are applied to the load, such as the CCD.

In a triode region where the voltage Vout is lower than the overdrive voltage of the transistors 582 and 583, since the conductance of the transistors decreases linearly and, therefore, the output current decreases, the final voltage Vout converges on the voltage V2.

At this time, no current is output from the current mirror circuit CM0. In the imaging apparatus according to the embodiment of the present invention, it is possible to prevent degradation in the image quality and to increase the processing speed in the system even if the vertical drive (vertical transfer) is performed during a period other than the horizontal scanning period.

First Problem of Two-Voltage Output Vertical Driver

A first problem of the vertical driver 50a according to the embodiment of the present invention, shown in FIG. 3, and a vertical driver 50c (refer to FIG. 6) provided to resolve the first problem will now be described.

The slope of the voltage Vout from the vertical driver 50a according to the embodiment of the present invention, shown in FIG. 3, is determined on the basis of the ratio of the current Iout from the vertical driver 50a to the load capacitance of the capacitor C62 in the CCD 60, as apparent from Equation (8). Accordingly, since CCDs of various types, which have greatly different electrode capacitances depending on the types, have different capacitances of the capacitors C62, the slope of the voltage Vout is varied depending on the types of the CCDs if the current Iout output from the vertical driver 50a is constant. Consequently, sufficient reduction in the interference between two or more drive voltages applied to the CCDs is not possibly achieved depending on the CCDs.

An embodiment of the present invention, which is capable of driving the CCD under the optimal conditions by using the same circuit as in FIG. 3, will now be described with reference to FIG. 6.

Resolving First Problem of Two-Voltage Output Vertical Driver

Figure 6:
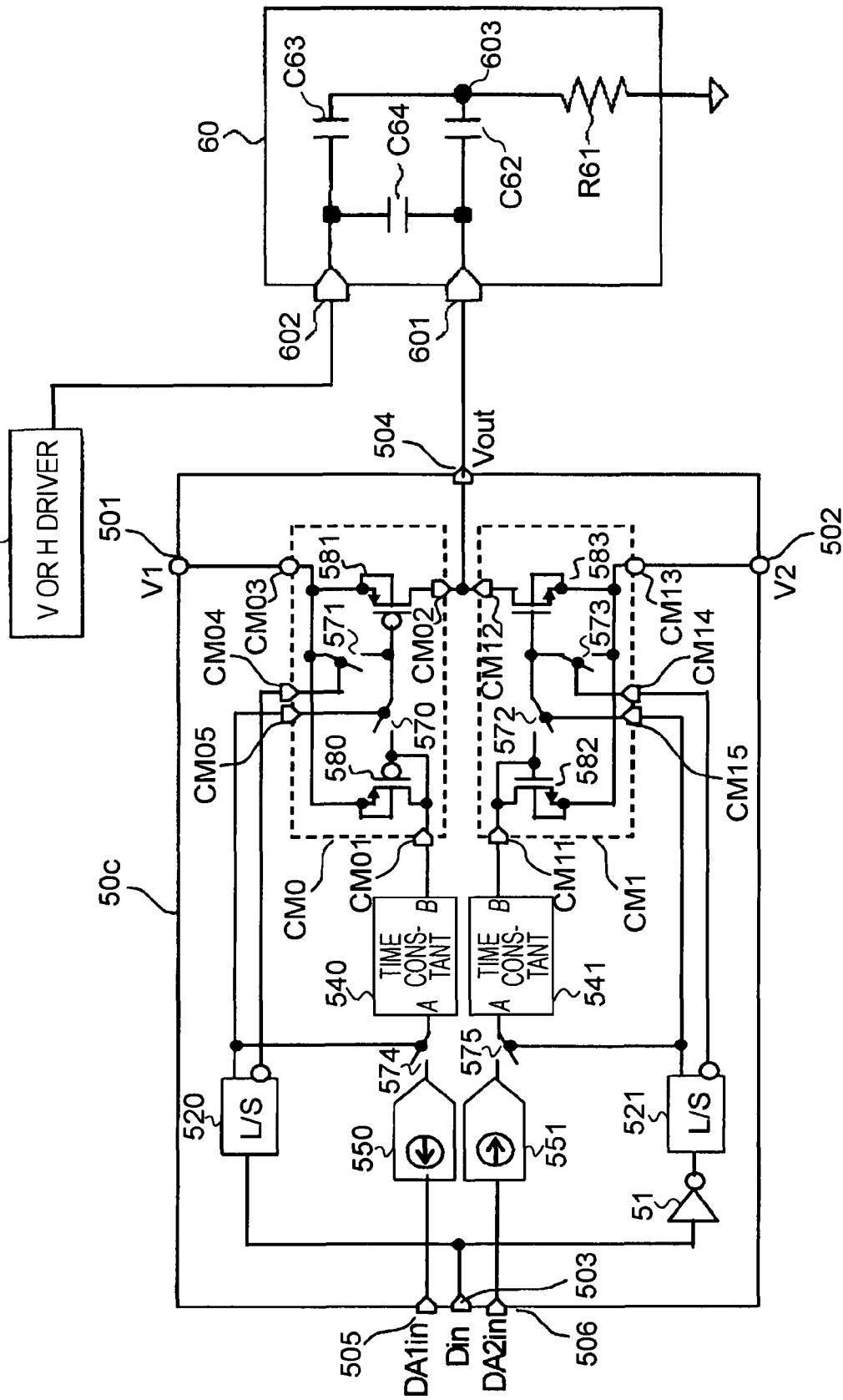
FIG. 6 shows an example of an equivalent circuit including a two-voltage output vertical driver, which is a drive circuit according to another embodiment of the present invention, and a CCD driven by the vertical driver.

FIG. 6 shows an example of an equivalent circuit including a vertical driver 50c, which is a drive circuit according to an embodiment of the present invention, and a CCD 60 driven by the vertical driver 50c.

The vertical driver 50c generates, for example, the vertical drive pulses φV1 to φV4 shown in FIG. 1. The CCD 60 includes the vertical transfer electrodes 121 to 124 to which the vertical drive pulses φV1 to φV4 are applied, respectively. Although the vertical driver 50c generates only one vertical drive pulse (output voltage Vout) in the equivalent circuit in FIG. 6 for simplicity, the CCD 60 is actually driven by multiple drivers (including the driver 70).

The vertical driver 50c differs from the vertical driver 50a in FIG. 3 in that the vertical driver 50c does not include the reference power supplies 530 and 531 and that the output side of a digital-to-analog converter (DAC) 550 is connected to one terminal of the switch 574 and the output side of a DAC 551 is connected to one terminal of the switch 575. The input sides of the DACs 550 and 551 are connected to input terminals 505 and 506 of the vertical driver 50c to receive signals DA1in and DA2in, respectively. Currents corresponding to the signals DA1in and DA2in are supplied to the DACs 550 and 551, respectively.

The vertical driver 50c varies the current supplied to the current mirror circuits by replacing the reference power supplies 530 and 531 in the vertical driver 50a shown in FIG. 3 with the DACs 550 and 551. The vertical driver 50c mirrors and outputs the currents corresponding to the input signals DA1in and DA2in input in the DACs 550 and 551 to control the current output from the vertical driver 50c.

With the above circuit configuration, it is possible to drive CCDs of various types, which have greatly different electrode capacitances depending on the types, by using the same circuit under the optimal conditions.

Second Problem of Two-Voltage Output Vertical Driver

A second problem of the vertical driver 50a according to the embodiment of the present invention, shown in FIG. 3, and a vertical driver 50f (refer to FIG. 8) provided to resolve the second problem will now be described.

When the CCD 60 is driven via the electrode 602 by the vertical or horizontal driver 70 shown in FIG. 3, the capacitor C64, which has the coupling capacitance between the electrodes 601 and 602, and the impedance output from the vertical driver 50a form a differentiation circuit and the voltage output from the vertical or horizontal driver 70 has an effect on the electrode 601 (interferes with the electrode 601).

The output impedance of the vertical driver 50a, which is a current mirror output, is higher than that of a CMOS drive circuit and, therefore, the interfering noise level between the output impedances is undesirably increased.

Figure 8:
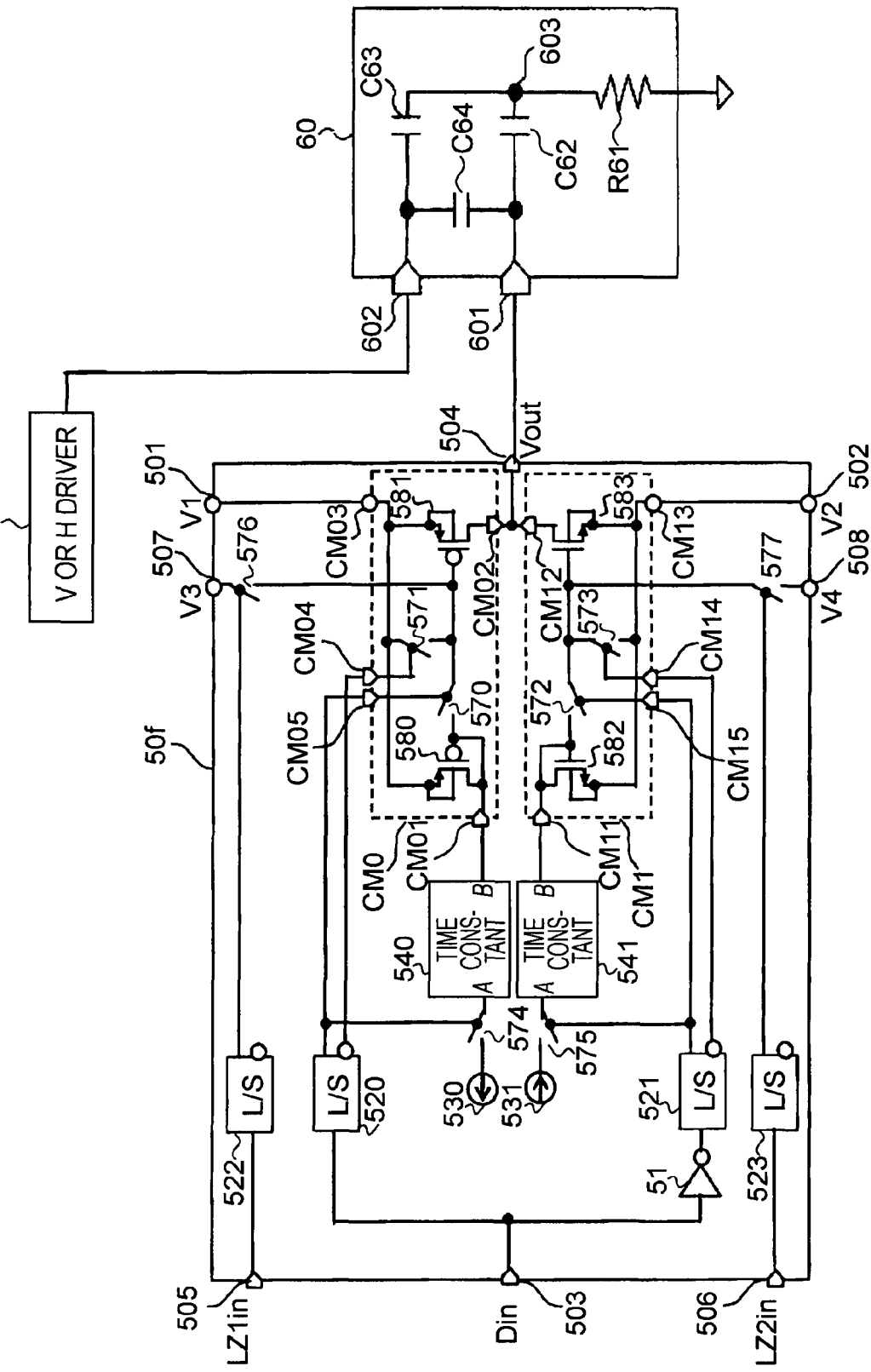
FIG. 8 shows an example of an equivalent circuit including a two-voltage output vertical driver, which is a drive circuit according to another embodiment of the present invention, and a CCD driven by the vertical driver.

Against the above problem, in the vertical driver 50f according to the embodiment of the present invention, shown in FIG. 8, when the voltage V1 or V2 is output from the vertical driver 50f and there is no transition, an arbitrary voltage is applied to the gate of the final transistor in the current mirror circuit through a switch to realize a lower impedance in order to reduce the interfering noise level.

Resolving Second Problem of Two-Voltage Output Vertical Driver

FIG. 8 shows an example of an equivalent circuit including a vertical driver 50f, which is a drive circuit according to an embodiment of the present invention, and a CCD 60 driven by the vertical driver 50f.

The vertical driver 50f generates, for example, the vertical drive pulses φV1 to φV4 shown in FIG. 1. The CCD 60 includes the vertical transfer electrodes 121 to 124 to which the vertical drive pulses φV1 to φV4 are applied, respectively. Although the vertical driver 50f generates only one vertical drive pulse (output voltage Vout) in the equivalent circuit in FIG. 8 for simplicity, the CCD 60 is actually driven by multiple drivers (including the driver 70).

In the vertical driver 50f, one terminal of a switch 576 is connected to the gate of the final transistor 581 in the current mirror circuit in the vertical driver 50a shown in FIG. 3, and one terminal of a switch 577 is connected to the gate of the final transistor 583 in the current mirror circuit in the vertical driver 50a shown in FIG. 3. An input terminal 507 of the vertical driver 50f is connected to the other terminal of the switch 576 to receive a voltage V3, and an input terminal 508 of the vertical driver 50f is connected to the other terminal of the switch 577 to receive a voltage V4.

Input terminals 505 and 506 of the vertical driver 50f are connected to level shifters 522 and 523, respectively. Voltages shifted to a level necessary for the switching are output from the output terminals of the level shifters 522 and 523.

The output terminals of the level shifters 522 and 523 are connected to the gates of the switches 576 and 577, respectively. Control signals LZ1in and LZ2in are received through input terminals 505 and 506 of the vertical driver 50f to control the switches 576 and 577, respectively.

In the vertical driver 50f according to the embodiment of the present invention, shown in FIG. 8, if the control signal LZ1in is in the "H" level when the H-level input signal Din is input through the input terminal 503, the signal V1 is output, and there is no transition, the gate of the final transistor 581 is connected to the input terminal 507 of the vertical driver 50f via the switch 576.

A voltage causing the final transistor 581 to have a sufficiently low on-resistance is applied through the input terminal 507. Accordingly, since the output impedance of the vertical driver 50f is kept low, transition of the vertical or horizontal driver 70 allows the interference level to be reduced via the capacitor C64 having the coupling capacitance between the electrodes 601 and 602 in the CCD 60.

In the vertical driver 50f according to the embodiment of the present invention, shown in FIG. 8, if the control signal LZ2in is in the "H" level when the L-level input signal Din is input through the input terminal 503, the signal V2 is output, and there is no transition, the gate of the final transistor 583 is connected to the input terminal 508 of the vertical driver 50f via the switch 577.

A voltage causing the final transistor 583 to have a sufficiently low on-resistance is applied through the input terminal 508. Accordingly, since the output impedance of the vertical driver 50f is kept low, transition of the vertical or horizontal driver 70 allows the interference level to be reduced via the capacitor C64 having the coupling capacitance between the electrodes 601 and 602 in the CCD 60.

With the above circuit configuration, it is possible to realize the driver characteristics that are unlikely to be affected by the interference by reducing the output impedance.

Third Problem of Two-Voltage Output Vertical Driver

A third problem of the vertical driver 50a according to the embodiment of the present invention, shown in FIG. 3, and a vertical driver 50h (refer to FIG. 11) provided to resolve the third problem will now be described.

When the signal Din supplied through the input terminal 503 of the vertical driver 50a is switched from the "L" level to "H" the level, the switches 574, 570, and 573 are turned on and the switches 571, 575, and 572 are turned off, and the current from the reference power supply 530 slowly flows into the current mirror circuit CM0 through the time constant circuit 540, as described above with reference to FIG. 3. In a saturation region where the voltage Vout is lower than the overdrive voltage of the transistors 580 and 581 lower than the voltage V1, a current mirrored from the voltage V1 in accordance with the size ratio between the P-type transistors 580 and 581 is slowly output from the output terminal 504 of the vertical driver 50a as the signal Vout.

A problem here is a delay time after the signal Din is switched from the "L" level to the "H" level before the current is output as the signal Vout. Parts where the delay time is dominant in the vertical driver 50h are involved in the time constant circuit 540 and the transistor 580 in the current mirror circuit CM0. The output voltage from the time constant circuit 540, that is, the gate voltage of the transistor 580 in the current mirror circuit CM0 is close to the level of the voltage V1 because the switches 574 and 570 are turned off and no power is supplied from the reference power supply 530 when the signal Din is in the "L" level.

Then, when the signal Din is switched from the "L" level to the "H" level, the switches 574 and 570 are turned on and the output voltage from the time constant circuit 540, that is, the gate voltage of the transistor 580 in the current mirror circuit CM0 begins to slowly decrease (in the direction in which the transistor 580 is turned on) in accordance with the time constant supplied from the time constant circuit 540.

However, a current is not immediately output from the current mirror circuit. A current is output from the current mirror circuit after the delay time during which the gate voltage of the transistor 580 in the current mirror circuit CM0 is increased from the level of the voltage V1 to a level that exceeds a threshold V1th of the transistor 580.

This delay time is sometimes about 10 μsec, thus causing a problem to the system. The output of the voltage V2 is also inversely affected by the delay time.

Resolving Third Problem of Two-Voltage Output Vertical Driver

If a voltage (Vs−V1th) given by subtracting the threshold V1th of the transistor 580 from a gate voltage Vs (is close to the voltage V1 in the circuit in FIG. 3) of the transistor 580 with the signal Din being in the "L" level exceeds zero when the signal Din is switched from the "L" level to the "H" level and the output from the time constant circuit 540 has a slope ΔVtc/Δt, a delay time Td is calculated according to Equation (9). If the voltage (Vs−V1th) is lower than or equal to zero, the delay time Td is equal to zero according to Equation (10).

$$(Vs-V1th) > 0$$

$$Td = |Vs-V1th| \cdot \Delta t / \Delta Vtc \quad (9)$$

$$(Vs-V1th) \leq 0$$

$$Td = 0 \quad (10)$$

Equation (9) shows that the delay time Td is reduced if the gate voltage Vs of the transistor 580 with the signal Din being in the "L" level is close to the threshold V1th.

An embodiment of the present invention in which the delay time is reduced will now be described with reference to FIG. 11. Power supplies 532 and 533 are provided in the vertical driver 50h in FIG. 11. The power supplies 532 and 533 apply minute currents to the outputs from the reference power supplies 530 and 531 shown in FIG. 3, respectively.

In the vertical driver 50h having the above configuration, when the signal Din is in the "L" level, a minute current output from the power supply 532 is supplied to the current mirror circuit CM0 through the time constant circuit 540. Accordingly, the transistor 580 keeps a gate voltage that slightly exceeds the threshold V1th of the transistor 580.

When the signal Din is then switched from the "L" level to the "H" level, as shown by Equation (10), (Vs−V1th)<0 and the delay time Td is equal to zero. Because of these characteristics, the delay time when the current is output is reduced to allow the system to be rapidly built.

Figure 5:
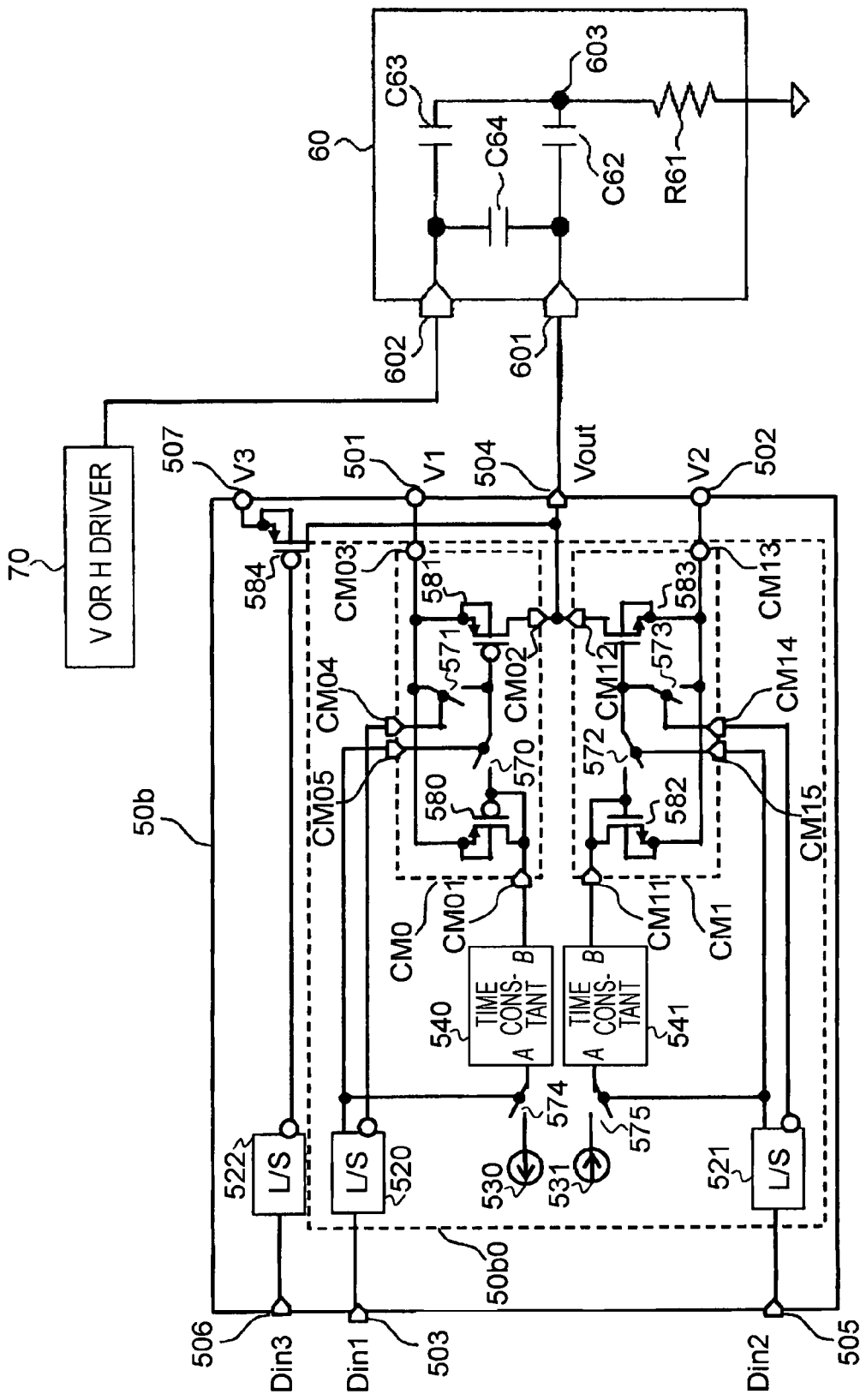
FIG. 5 shows an example of an equivalent circuit including a three-voltage output vertical driver, which is a drive circuit according to an embodiment of the present invention, and a CCD driven by the vertical driver.

Equivalent Circuit of Three-Voltage Output Vertical Driver and Vertical Electrode FIG. 5 shows an example of an equivalent circuit including a three-voltage output vertical driver 50b, which is a drive circuit according to an embodiment of the present invention, and a CCD 60 driven by the vertical driver 50b.

The vertical driver 50b generates, for example, the vertical drive pulses φV1 to φV4 shown in FIG. 1. The CCD 60 includes the vertical transfer electrodes 121 to 124 to which the vertical drive pulses φV1 to φV4 are applied, respectively. Although the vertical driver 50b generates only one vertical drive pulse (output voltage Vout) in the equivalent circuit in FIG. 5 for simplicity, the CCD 60 is actually driven by multiple drivers (including the driver 70).

The vertical driver 50a in FIG. 3 outputs the two voltages V1 and V2, while the vertical driver 50b in FIG. 4 outputs three voltages V1, V2, and V3.

Parts in the vertical driver 50b in FIG. 5, added to or deleted from the vertical driver 50a in FIG. 3, will be described. The vertical driver 50b in FIG. 5 outputs the voltage V3, in addition to the voltages V1 and V2, so that the input voltage V3 is supplied through an input terminal 507 that is connected to the source and bulk of a p-channel MOS (PMOS) transistor 584.

The drain of the PMOS transistor 584 is connected to an output terminal 504 of the vertical driver 50b, through which the signal Vout is output to drive the CCD 60. Input signals Din1, Din2, and Din3 are supplied through input terminals 503, 505, and 506 of the vertical driver 50b, respectively, to output the three voltages V1, V2, and V3.

The input terminals 503, 505, and 506 of the vertical driver 50b are connected to the input terminals of level shifters 520, 521, and 522, respectively. The inverted output terminal of the level shifter 522 is connected to the gate of the PMOS transistor 584 to drive the PMOS transistor 584 from which the voltage V3 is output. An area 50b0 including the level shifters 520 and 521, the reference power supplies 530 and 531, the time constant circuits 540 and 541, and the current mirror circuits CM0 and CM1 is similar to the corresponding area in the vertical driver 50a in FIG. 3.

When the input signal Din1 is in the "H" level and the input signals Din2 and Din3 are in the "L" level, the signal Vout output through the output terminal 504 has the voltage V1, as in the vertical driver 50a in FIG. 3.

When the input signal Din2 is in the "H" level and the input signals Din1 and Din3 are in the "L" level, the signal Vout output through the output terminal 504 has the voltage V2, as in the vertical driver 50a in FIG. 3.

In the output of the voltages V1 and V2, it is possible to reduce the interference between the drive voltages if the vertical driver 50b has a function of reducing the transient speed ΔV/ΔT and two or more drive voltages are applied to the load, such as the CCD.

When the input signal Din3 is in the "H" level and the input signals Din1 and Din2 are in the "L" level, the signal Vout output through the output terminal 504 has the voltage V3. At this time, the presence of the PMOS transistor 584 increases the transient speed. With the configuration shown in FIG. 5, the vertical driver 50b can output the three values V1, V2, and V3.

First Problem of Three-Voltage Output Vertical Driver

Figure 11:
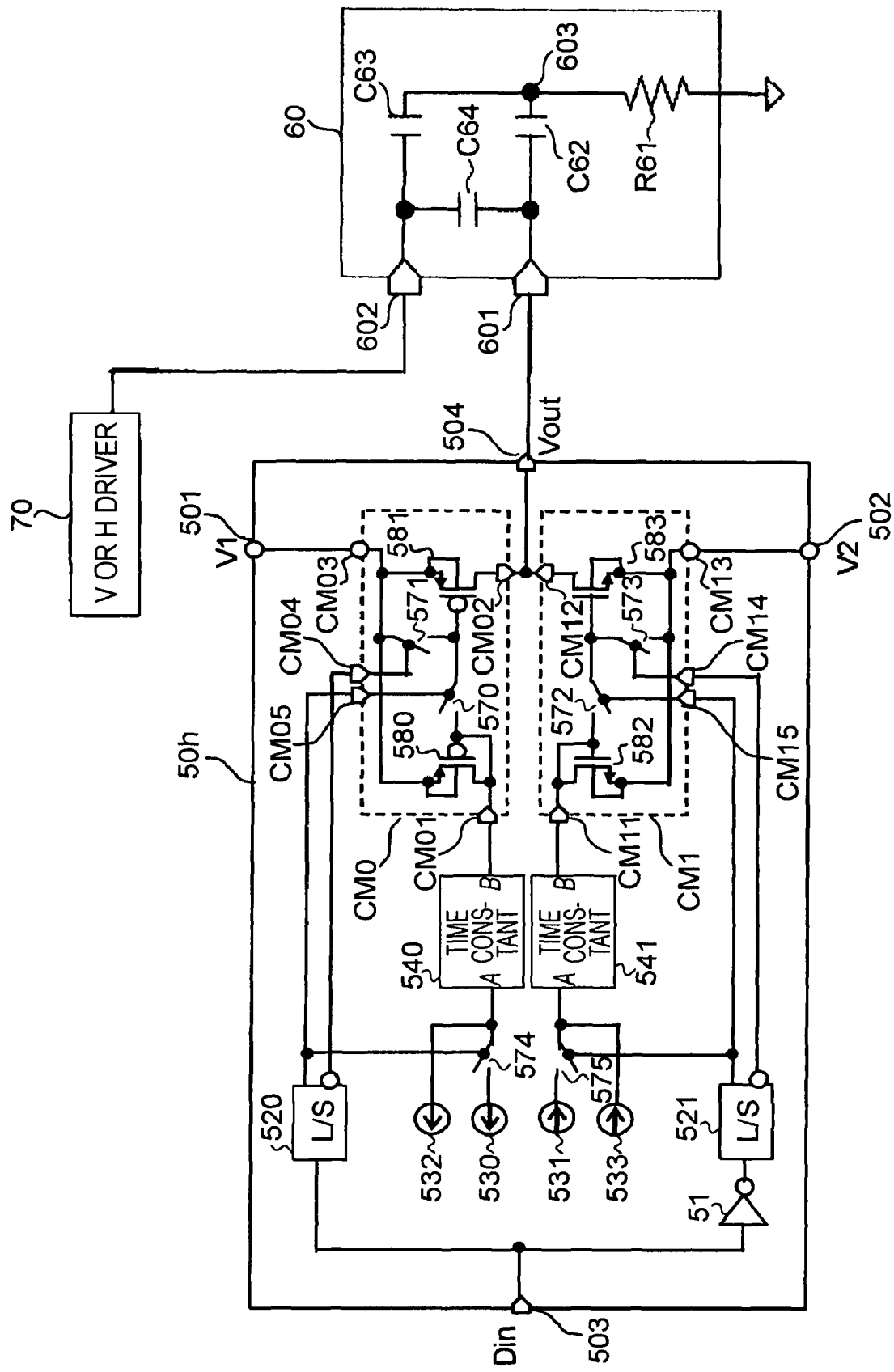
FIG. 11 shows an example of an equivalent circuit including a two-voltage output vertical driver, which is a drive circuit according to another embodiment of the present invention, and a CCD driven by the vertical driver.
Figure 12A:
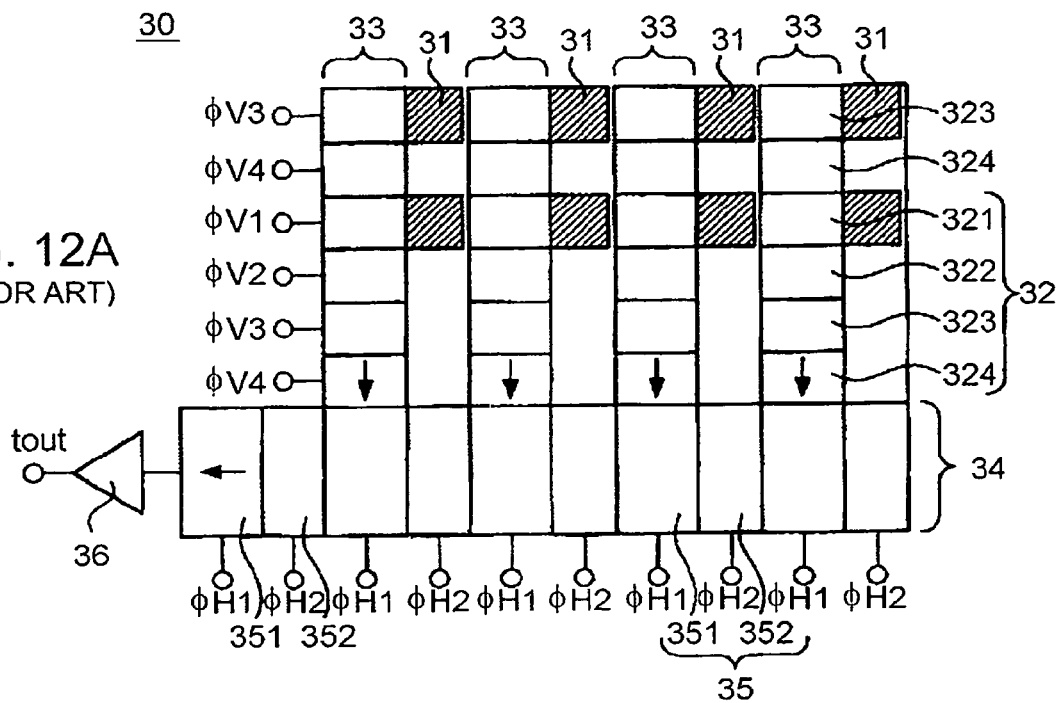
FIG. 12A shows an example of the structure of a CCD imaging apparatus in related art and FIG. 12B illustrates how to drive the CCD imaging apparatus.
Figure 12B:
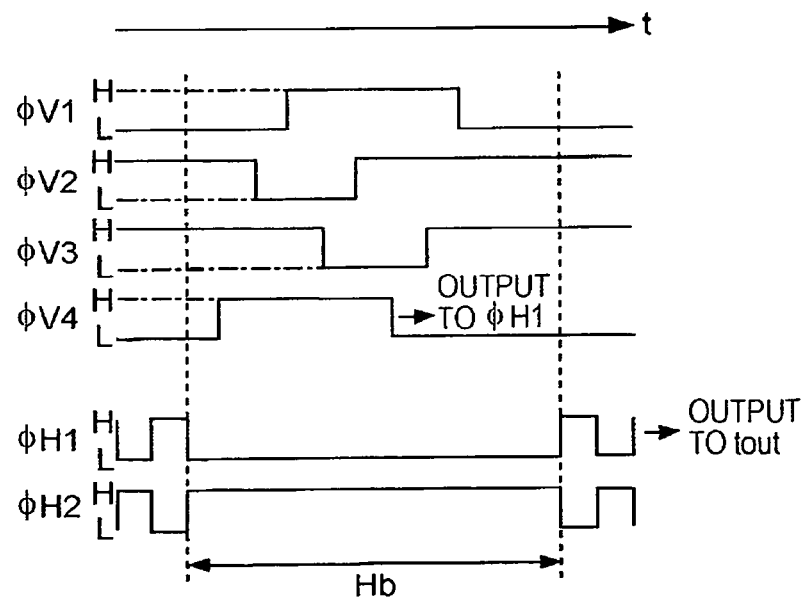
Figure 13:
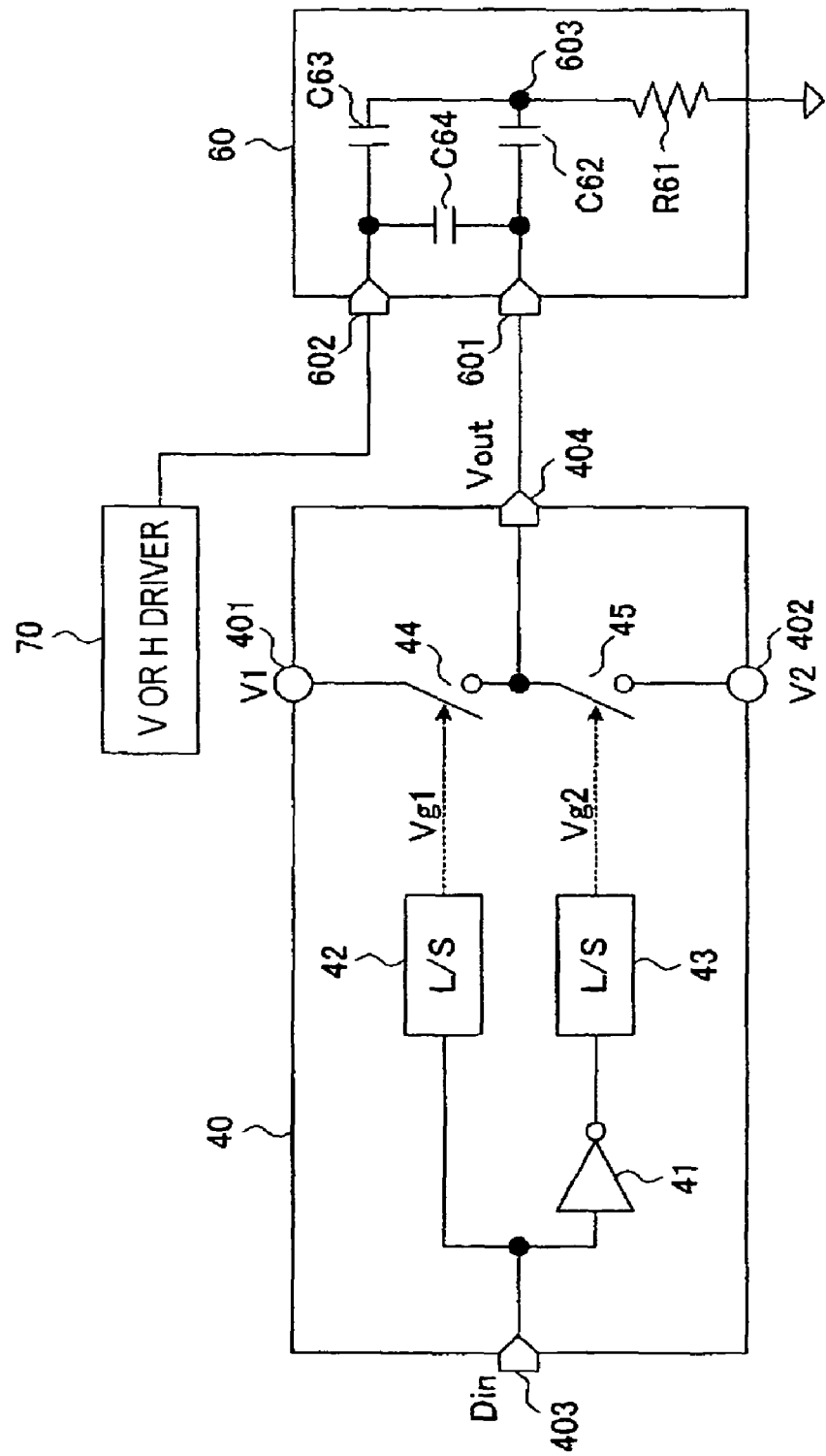
FIG. 13 shows an equivalent circuit of a CCD and a vertical driver in related art.
Figure 14A:
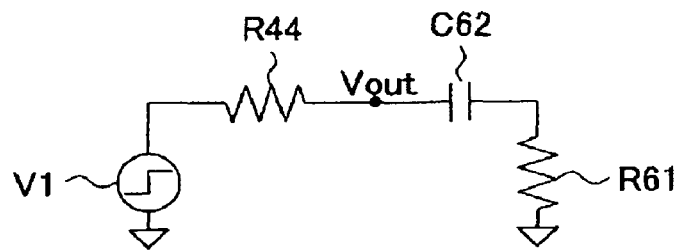
FIG. 14A shows an equivalent circuit for yielding a step response of an output voltage from the vertical driver in the related art and FIG. 14B shows examples of response waveforms output from the equivalent circuit in FIG. 14A.
Figure 14B:
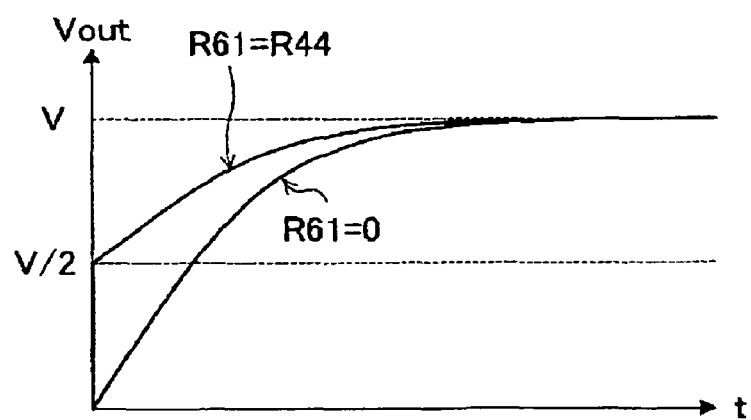

A first problem of the vertical driver 50b in FIG. 11 is in that the size of the circuit is likely to increase because of the provision of the reference power supplies, the time constant circuits, and current mirror circuits, compared with CMOS vertical drivers in related art. Accordingly, the components in the circuit upstream of the final output transistor are shared to reduce the size of the circuit.

Resolving First Problem of Three-Voltage Output Vertical Driver

Figure 7:
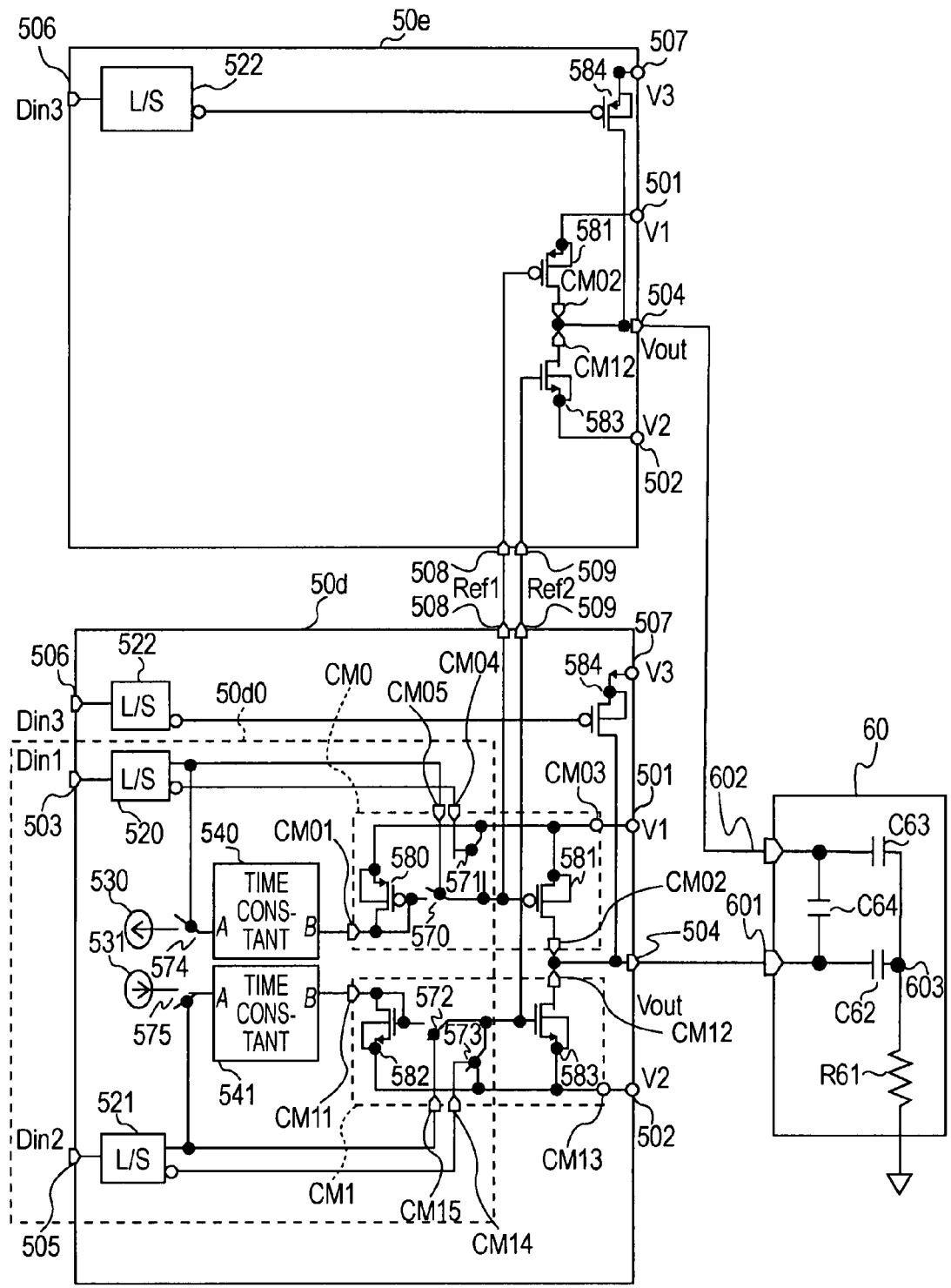
FIG. 7 shows an example of an equivalent circuit including a three-voltage output vertical driver, which is a drive circuit according to another embodiment of the present invention, and a CCD driven by the vertical driver.

FIG. 7 shows an embodiment of the present invention, in which the components in the circuit are shared to reduce the size of the circuit. The circuit shown in FIG. 7 includes two vertical drivers having a function similar to the function of outputting the three voltages to drive the CCD 60, shown in FIG. 5. The phase of the output voltage V1 is the same as that of the output voltage V2 while the phase of the output voltage V3 is different from those of the output voltages V1 and V2.

FIG. 7 shows an example of an equivalent circuit including vertical drivers 50d and 50e, which corresponds to a drive circuit according to an embodiment of the present invention, and a CCD 60 driven by the vertical drivers 50d and 50e.

The vertical drivers 50d and 50e generate, for example, the vertical drive pulses φV1 to φV4 shown in FIG. 1. The CCD 60 includes the vertical transfer electrodes 121 to 124 to which the vertical drive pulses φV1 to φV4 are applied, respectively.

In the vertical driver 50d in FIG. 7, the gate voltages of PMOS transistors 581 and 583 are output from the vertical driver 50b shown in FIG. 5 through output terminals 508 and 509 as reference voltages Ref1 and Ref2.

In the vertical driver 50e in FIG. 7, an area 50d0 including the level shifters 520 and 521, the reference power supplies 530 and 531, the time constant circuits 540 and 541, the PMOS transistor 580 in the current mirror circuit CM0, the n-channel MOS (NMOS) transistor 582 in the current mirror circuit CM1, and the switches 570 to 575 is removed from the vertical driver 50d in FIG. 7. The gate voltages Ref1 and Ref2 of the PMOS and NMOS transistors through which the voltages V1 and V2 are output are applied from the vertical driver 50d to the vertical driver 50e through input terminals 508 and 509 and, then, are applied to the gates of the PMOS transistor 581 and NMOS transistor 583 in the vertical driver 50e to share the area 50d0 between the vertical driver 50d and the vertical driver 50e, thus reducing the size of the circuit.

With this configuration, it is possible to reduce the power consumption, characteristic error between the drivers, and the cost, in addition to the size of the circuit.

Second Problem of Three-Voltage Output Vertical Driver

A second problem of the vertical driver 50b shown in FIG. 5 will now be described. It is assumed that the voltages V1, V2, and V3 input in the vertical driver 50b in FIG. 5 have a relationship V2<V1<V3.

When the voltage V3 to be output is higher than the voltage V1 to be output in the vertical driver 50b in FIG. 5 and the voltage V3 is output as the output voltage Vout, the bulk voltage Vb of the PMOS transistor 581 in the current mirror circuit CM0 is equal to V1 and the drain voltage Vd thereof is equal to V3. Accordingly, a relationship Vb<Vd is established.

The PMOS transistor has a diode structure in which the drain functions as an anode and the bulk functions as a cathode. Accordingly, if the drain voltage Vd is higher than (the bulk voltage Vb+the threshold Vt of the diode), a forward current flows through the diode and the on-resistance of the PMOS transistor 581 is lower than that of the PMOS transistor 584. As a result, even if the voltage V3 is to be output as the output voltage Vout, the voltage V3 higher than (the bulk voltage Vb+the threshold Vt of the diode), that is, (the voltage V1+the threshold Vt of the diode) is not output.

Resolving Second Problem of Three-Voltage Output Vertical Driver

In order to resolve the second problem, in the output of the voltage V3 as the output voltage Vout, the bulk voltage Vb of the PMOS transistor 581 is supplied as the voltage V3 or the output voltage Vout to operate the PMOS transistor 581 so as to satisfy (the drain voltage Vd)<(the bulk voltage Vb+the threshold Vt of the diode). As a result, a voltage up to the voltage V3 can be output as the output voltage Vout. A circuit realizing this resolution will now be described with reference to FIGS. 9 and 10.

Figure 9:
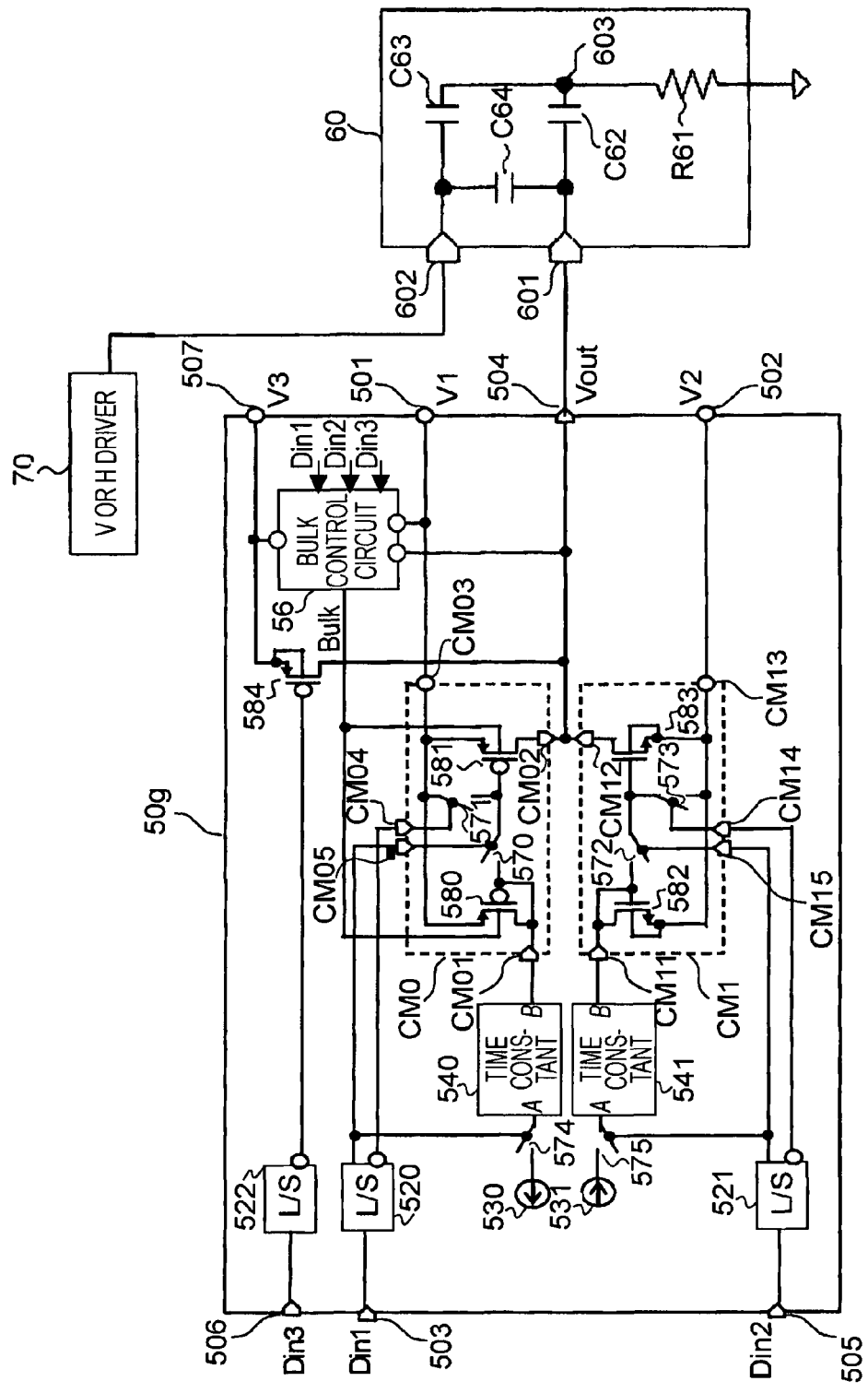
FIG. 9 shows an example of an equivalent circuit including a three-voltage output vertical driver, which is a drive circuit according to another embodiment of the present invention, and a CCD driven by the vertical driver.

FIG. 9 shows an example of an equivalent circuit including a vertical driver 50g, which is a drive circuit according to an embodiment of the present invention, and a CCD 60 driven by the vertical driver 50g.

The vertical driver 50g generates, for example, the vertical drive pulses φV1 to φV4 shown in FIG. 1. The CCD 60 includes the vertical transfer electrodes 121 to 124 to which the vertical drive pulses φV1 to φV4 are applied, respectively. Although the vertical driver 50g generates only one vertical drive pulse (output voltage Vout) in the equivalent circuit in FIG. 9 for simplicity, the CCD 60 is actually driven by multiple drivers (including the driver 70).

In the vertical driver 50g in FIG. 9, the bulk voltages Vb of the PMOS transistors 580 and 581 in the current mirror circuit CM0 are supplied to the output terminal of a bulk control circuit 56, unlike the vertical driver 50b in FIG. 5 in which the bulk voltages Vb of the PMOS transistors 580 and 581 in the current mirror circuit CM0 are supplied as the voltage V1. The voltages V1, V3, Vout, Din1, Din2, and Din3 are supplied to the input terminals of the bulk control circuit 56.

Figure 10:
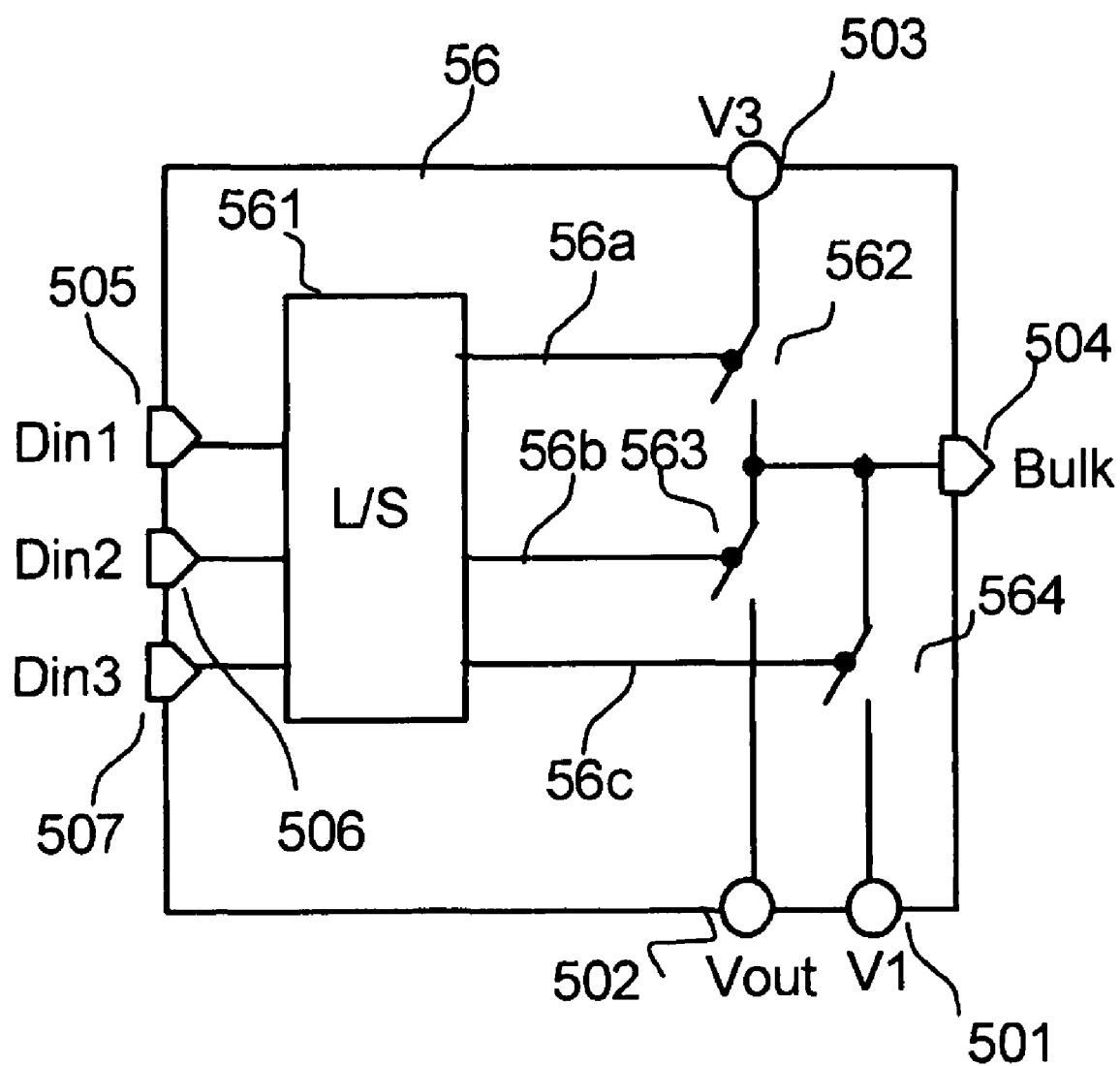
FIG. 10 shows an example of a bulk control circuit.

FIG. 10 shows an example of the bulk control circuit 56. Referring to FIG. 10, the input voltages Din1, Din2, and Din3 are applied to input terminals 505, 506, and 507 of the bulk control circuit 56, respectively. The input terminals 505, 506, and 507 are connected to the input terminals of a level shifter 561.

An output signal 56a from the level shifter 561 is applied to the gate of a switch 562, an output signal 56b thereof is applied to the gate of a switch 563, and an output signal 56c thereof is applied to the gate of a switch 564. The level shifter 561 outputs voltages that can drive the switches 562, 563, and 564.

In the bulk control circuit 56 in FIG. 10, the input voltages V1, V3, and Vout are applied to input terminals 501, 503, and 502, respectively. The input terminal 501 is connected to one terminal of the switch 564, the input terminal 503 is connected one terminal of the switch 562, and the input terminal 502 is connected to one terminal of the switch 563.

The other terminals of the switches 564, 562, and 563 are connected to an output terminal 504 of the bulk control circuit 56, through which an output signal Bulk is output from the bulk control circuit 56.

The bulk control circuit 56 shown in FIGS. 9 and 10 will now be described. When the input signal Din3 is in the "H" level and the input signals Din1 and Din2 are in the "L" level, the voltage V3 is output through the output terminal 504 of the vertical driver 50g as the signal Vout. At this time, in the bulk control circuit 56, the switch 562 is turned on and the switches 563 and 564 are turned off to output the voltage V3 as the output signal Bulk from the bulk control circuit 56.

Accordingly, the drain voltage Vd of the PMOS transistor 581 in the vertical driver 50g in FIG. 9 is equal to the bulk voltage Vb that is equal to the voltage V3, so that no forward current is produced, thus causing the above problem.

When the input signal Din1 is switched to the "H" level and the input signals Din3 and Din2 are switched to the "L" level from the above state and the output voltage Vout from the vertical driver 50g is switched from the voltage V3 to the voltage V1, the switch 563 in the bulk control circuit 56 is turned on and the switches 562 and 564 therein are turned off. In this state, the bulk control circuit 56 is controlled so as to output the output voltage Vout as the output signal Bulk.

The bulk control circuit 56 is controlled so as to output the output voltage Vout, instead of the voltage V1, as the output voltage Bulk in the stage in which the output voltage Vout from the vertical driver 50g is switched from the voltage V3 to the voltage V1. This control is performed in order to prevent any forward current from flowing between the bulk and the drain. The prevention of the forward current is achieved by reducing the transient speed of the output voltage Vout and by rapidly switching the output voltage Bulk from the bulk control circuit 56, that is, the bulk voltage Vb of the PMOS transistor 581 to the voltage V1 to make the bulk voltage Vb of the PMOS transistor 581 lower than the drain voltage Vd.

Furthermore, when the input signal Din2 is in the "H" level and the input signals Din1 and Din3 are in the "L" level and when the input signal Din1 is switched to the "H" level and the input signals Din2 and Din3 are switched to the "L" level from the this state and the output voltage Vout from the vertical driver 50g is the voltage V2 or is switched from the voltage V2 to the voltage V1, the switch 564 of the bulk control circuit 56 is turned on and the switches 562 and 563 thereof are turned off to control the bulk control circuit 56 so as to output the voltage V1 as the output signal Bulk.

As a result, the bulk voltage Vb of such a PMOS transistor becomes equal to the voltage V1 and the drain voltage Vd thereof becomes equal to the voltage V2 or V1. Consequently, it is possible to resolve the problem in that the forward current flows between the bulk and the drain because the relationship V2<V1 is established.

With the above configuration, it is possible to resolve the problem of the vertical driver 50b in FIG. 5 in that the voltage V3 that is higher than or equal to (the voltage V1+the threshold Vt of the diode) is not output. Consequently, the dynamic range of the output voltage can be expanded to accommodate CCDs of various types, which have greatly different electrode capacitances depending on the types.

It should be understood by those skilled in the art that various modifications, combinations, sub-combinations and alterations may occur depending on design requirements and other factors insofar as they are within the scope of the appended claims or the equivalents thereof.

What is claimed is:

1. A drive circuit applying two or more drive voltages to a signal transfer unit of a solid-state imaging device, the drive circuit comprising:
    at least one current mirror circuit that receives a reference current and outputs a predetermined current;
    at least one switch circuit that switches the current output from the at least one current mirror circuit to apply the drive voltages to the signal transfer unit; and
    at least one time constant circuit that provides a predetermined time constant to the reference current; and
    a circuit that applies a minute current to the current mirror circuit, when the current is switched in the switch circuit, to keep a gate voltage near a threshold of the circuit.

2. The drive circuit for the charge transfer unit according to claim 1, further comprising:
    a digital-to-analog converter that changes a current input to the current mirror circuit to vary the output current.

3. The drive circuit for the charge transfer unit according to claim 1,
    wherein a predetermined voltage is applied to a gate of a final output transistor in the current mirror circuit without the drive voltages being switched.

4. The drive circuit for the charge transfer unit according to claim 1, further comprising:
    a switching circuit that switches a bulk voltage of a transistor in the current mirror circuit.

5. A driving method of applying two or more drive voltages to a signal transfer unit of a solid-state imaging device, the method comprising:
    outputting a current from a reference current that is applied to at least one current mirror circuit; and
    providing a predetermined time constant to rising and falling edges of the reference current, and wherein the output current is switched by at least one switch circuit to apply the multiple drive voltages to the signal transfer unit, and
    wherein a minute current is applied to the current mirror circuit, when the current is switched in the switch circuit, to keep a gate voltage near a threshold of the circuit.

6. The driving method for the charge transfer unit, according to claim 5,
    wherein a predetermined voltage is applied to a gate of a final output transistor in the current mirror circuit without the drive voltages being switched.

7. A signal transfer system applying two or more drive voltages to a vertical signal transfer unit, the signal transfer system comprising:
    a drive circuit that receives a reference current and outputs a current through at least one current mirror circuit and provides a predetermined time constant to rising and falling edges of the reference current, and wherein the output current is switched by at least one switch circuit to apply the multiple drive voltages to the vertical charge transfer unit; and
    a controller that performs signal transfer by the drive circuit in the vertical charge transfer unit during a signal transfer period in a horizontal charge transfer unit, and
    a circuit that applies a minute current to the current mirror circuit, when the current is switched in the switch circuit, to keep a gate voltage near a threshold of the circuit.

8. The charge transfer system according to claim 7, further comprising:
    a buffer unit that temporarily stores the signal between the vertical charge transfer unit and the horizontal signal transfer unit,
    wherein the controller transfers the signal from the buffer unit to the horizontal signal transfer unit during a period when the signal transfer in the horizontal signal transfer unit is not performed.

9. The charge transfer system according to claim 7,
    wherein components in the current mirror circuit, excluding the switch circuit, a time constant circuit, and a final output transistor, are shared between multiple driver circuits.

* * * * *